Oct. 22, 1929.　　　G. W. NEVILLE　　　1,732,982
JACQUARD CARD PUNCHING MACHINE
Filed Oct. 3, 1927　　14 Sheets-Sheet 2

Inventor.—
George W. Neville
by his Attorneys
Howson + Howson

Oct. 22, 1929.                G. W. NEVILLE                 1,732,982
                        JACQUARD CARD PUNCHING MACHINE
                          Filed Oct. 3, 1927        14 Sheets-Sheet 3
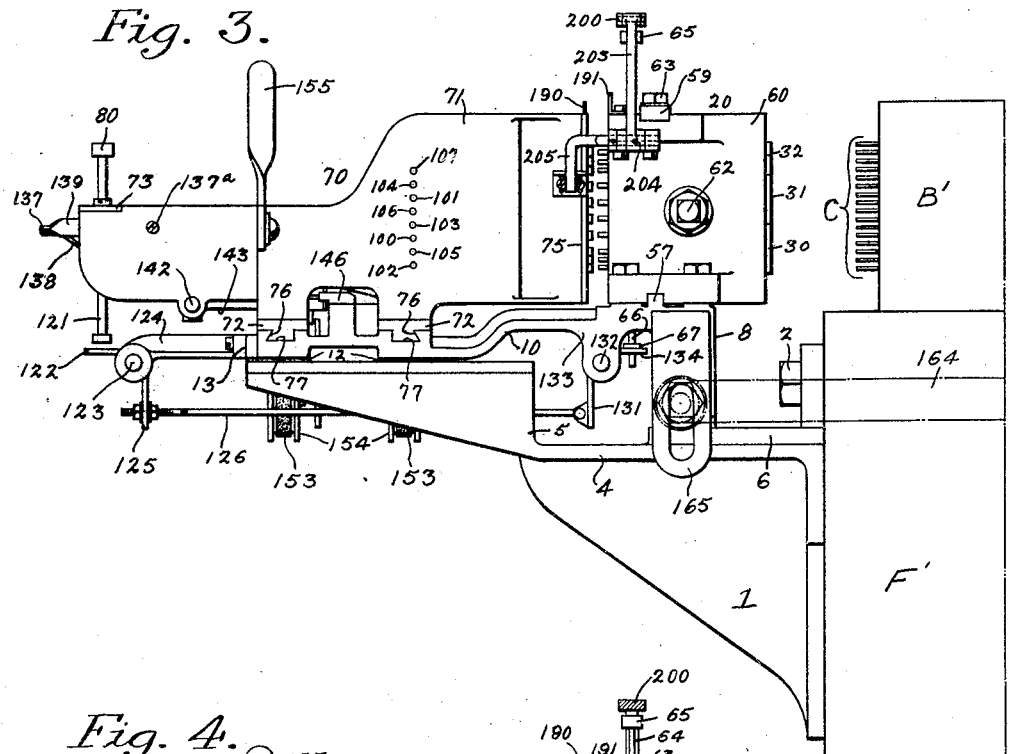
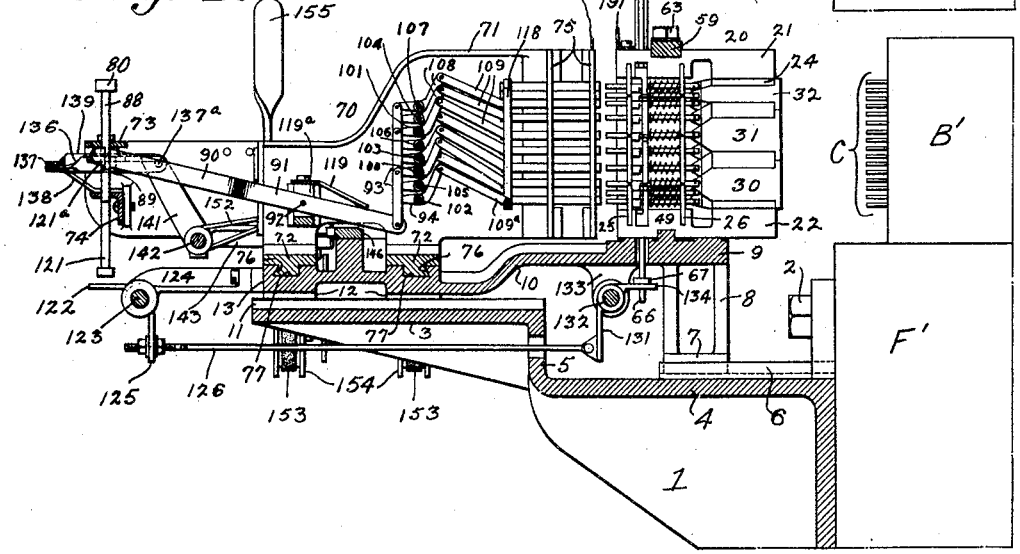
Inventor:-
George W. Neville,
by his Attorneys
Howson & Howson

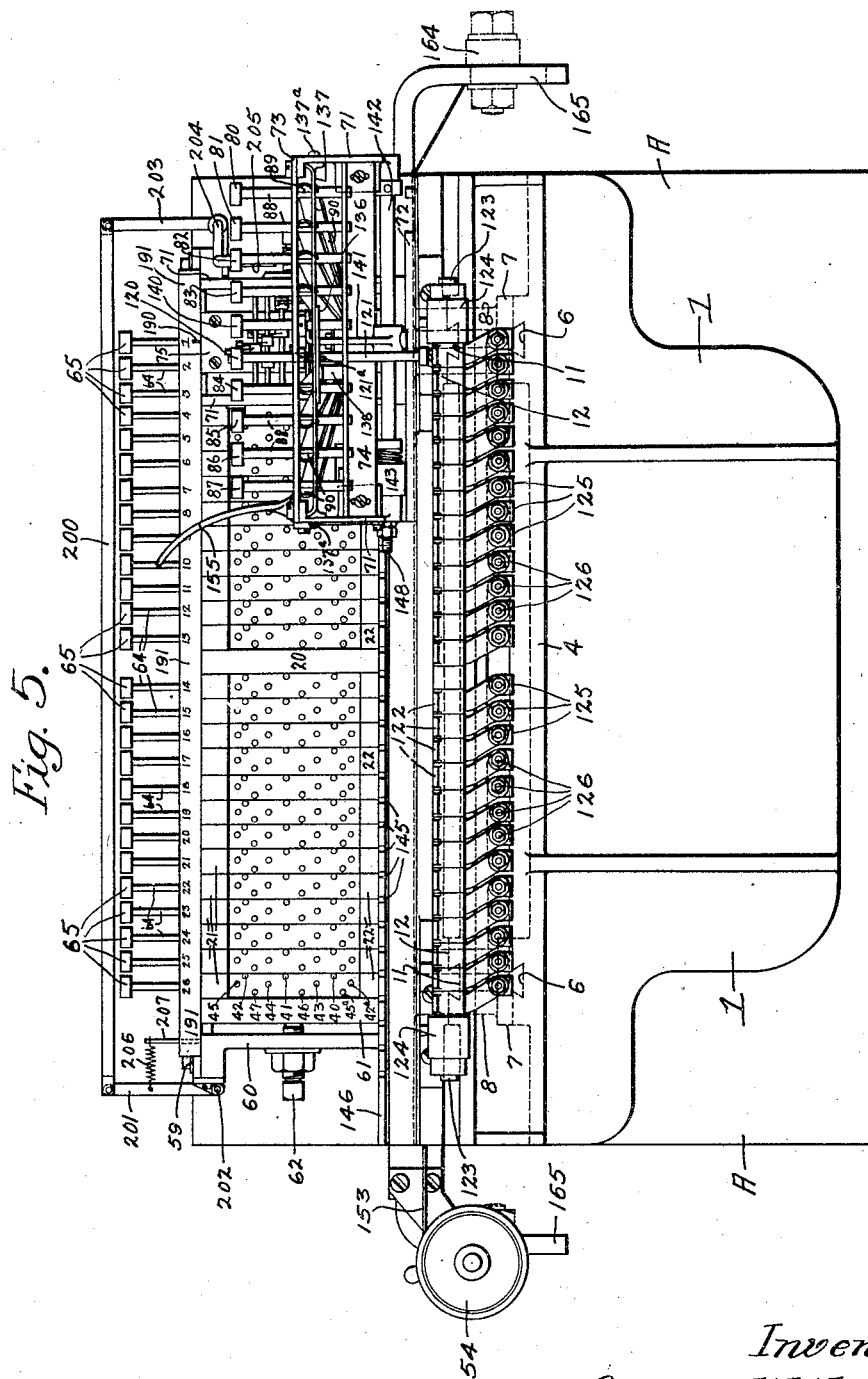

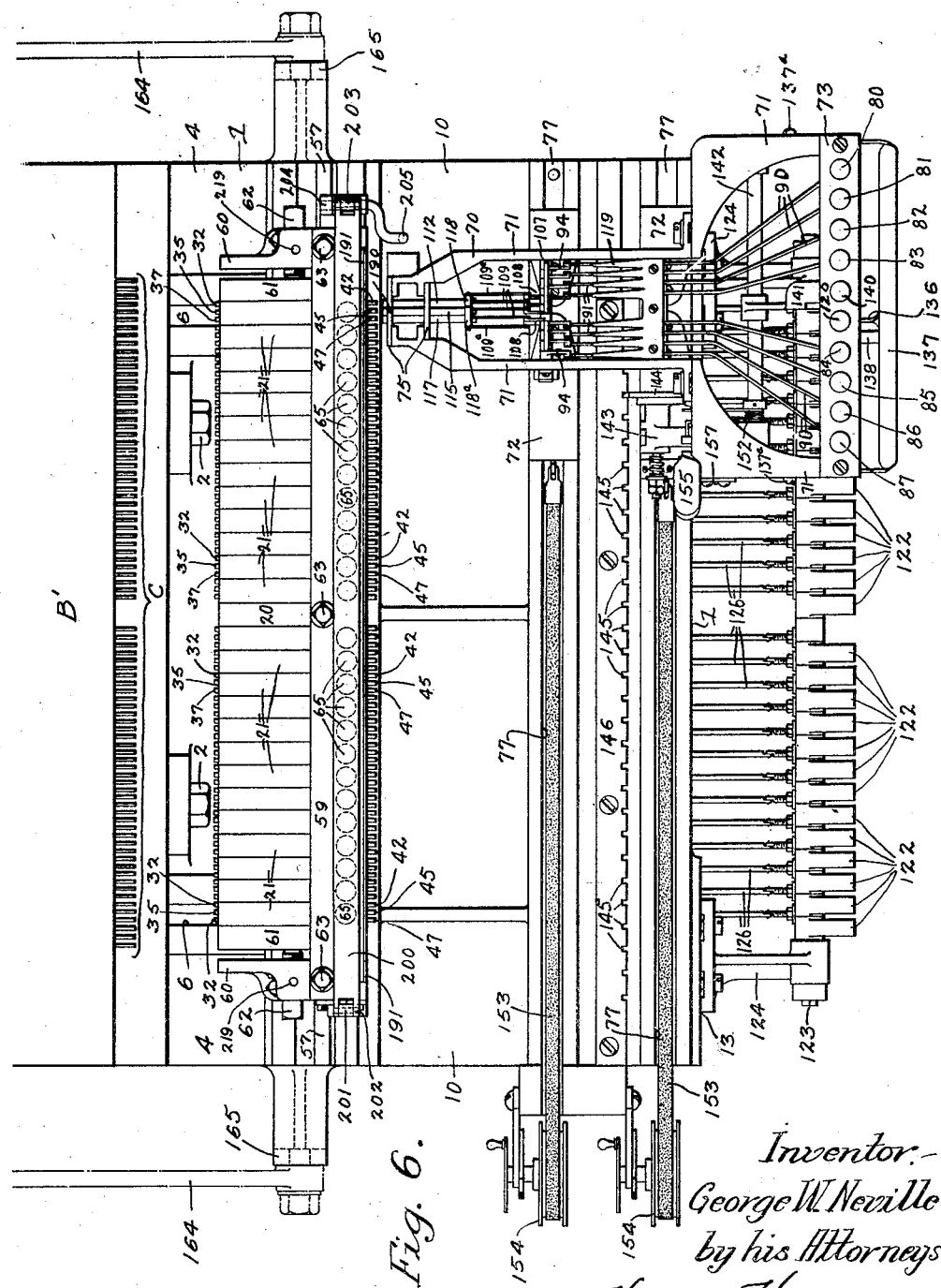

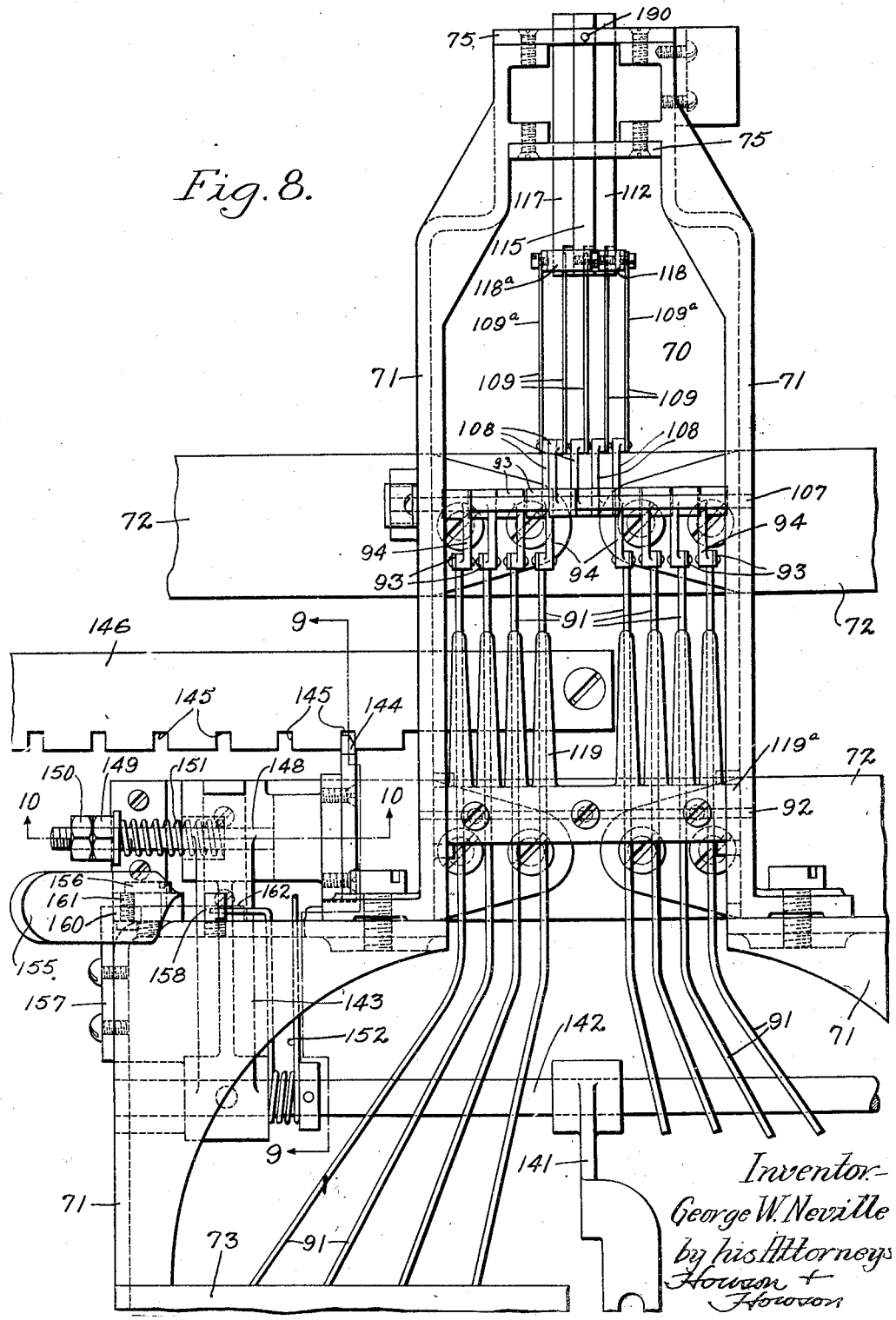

Oct. 22, 1929.   G. W. NEVILLE   1,732,982
JACQUARD CARD PUNCHING MACHINE
Filed Oct. 3, 1927   14 Sheets-Sheet 7

Inventor –
George W. Neville
by his Attorneys
Howson + Howson

Oct. 22, 1929.  G. W. NEVILLE  1,732,982
JACQUARD CARD PUNCHING MACHINE
Filed Oct. 3, 1927  14 Sheets-Sheet 8
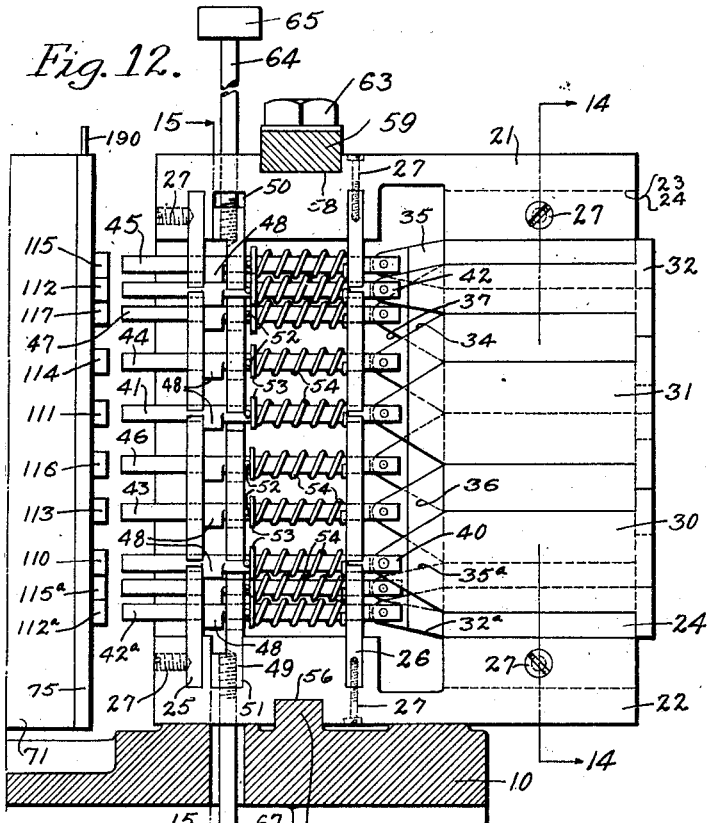
Inventor—
George W. Neville
by his Attorneys
Howson + Howson

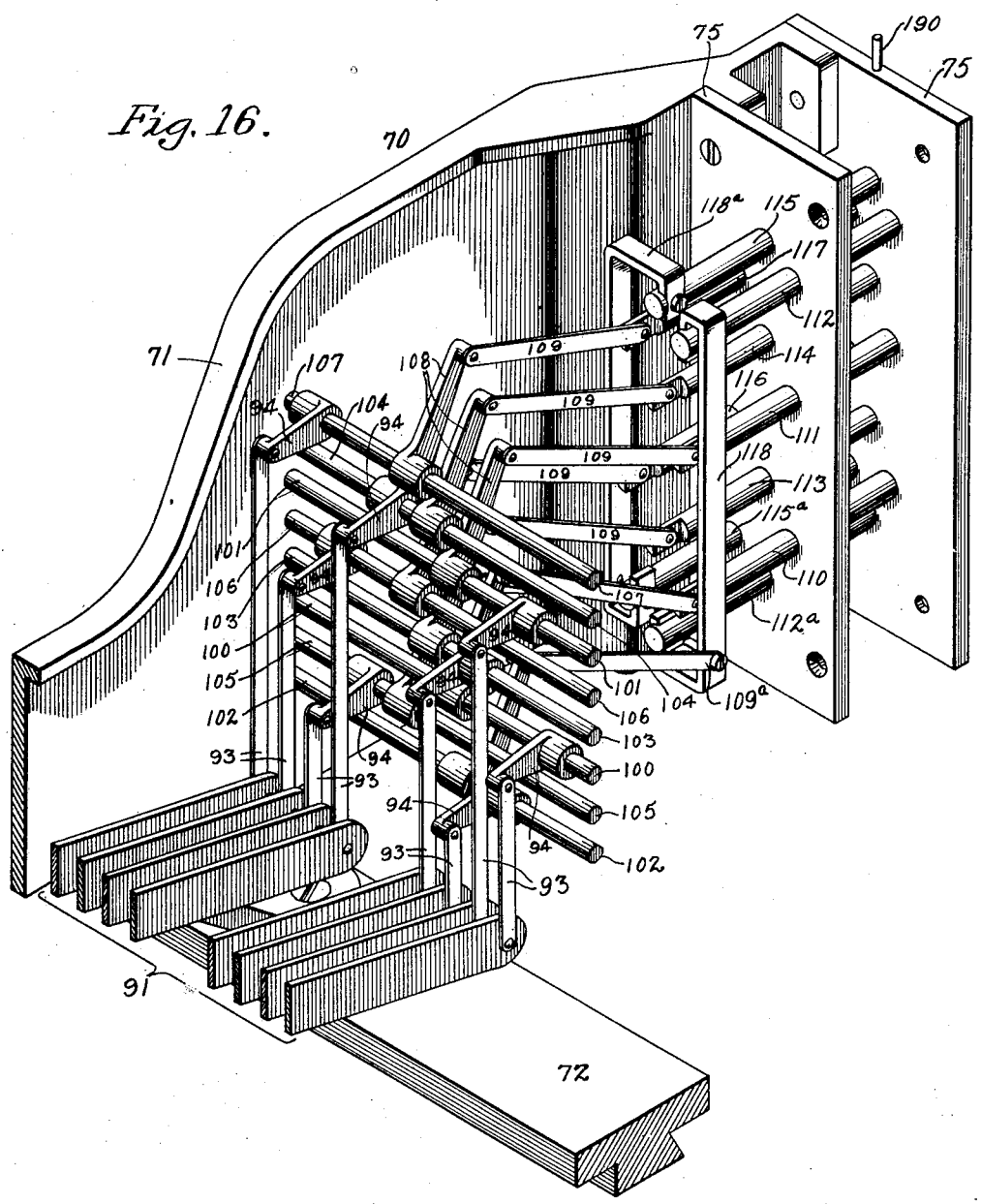

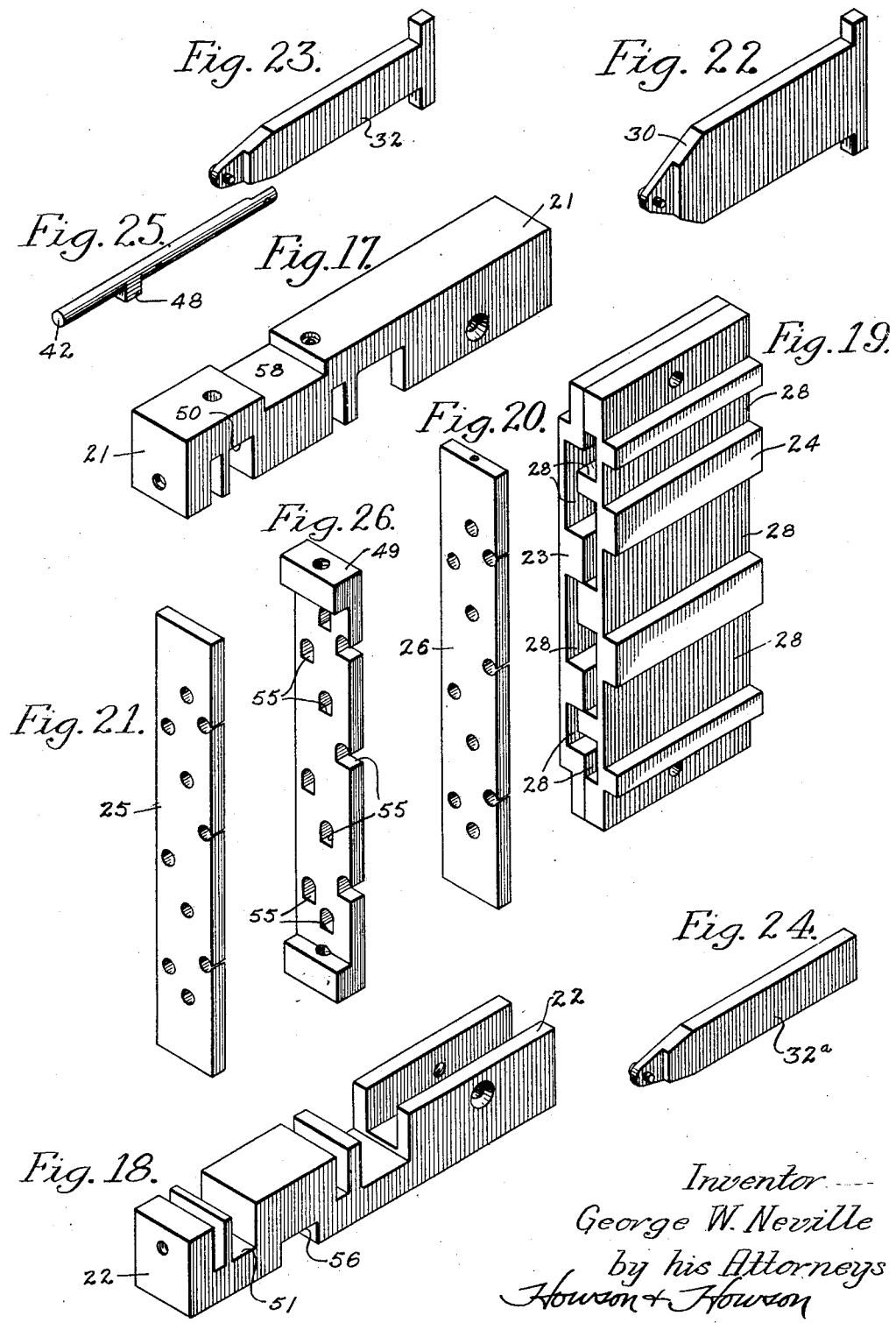

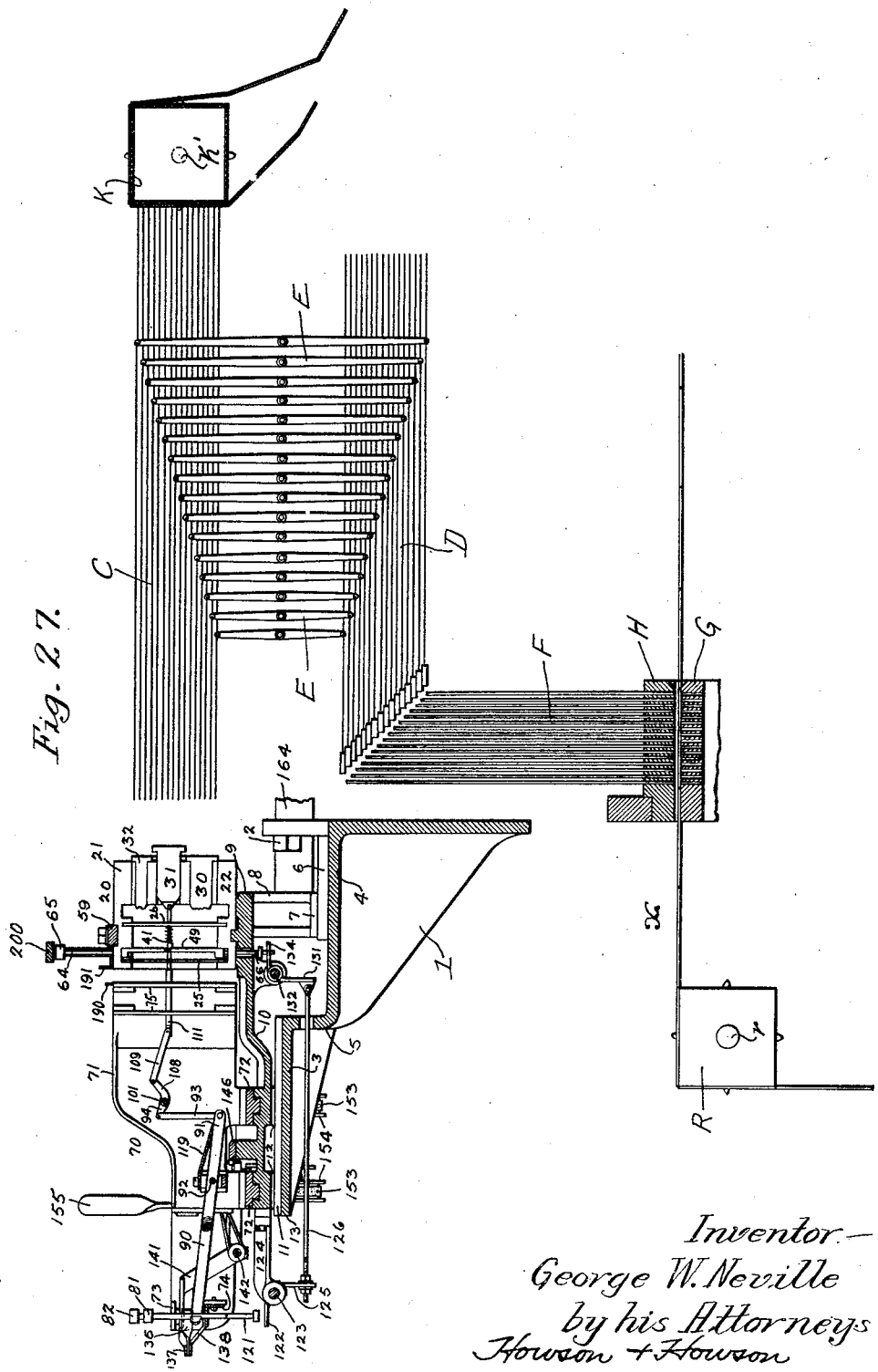

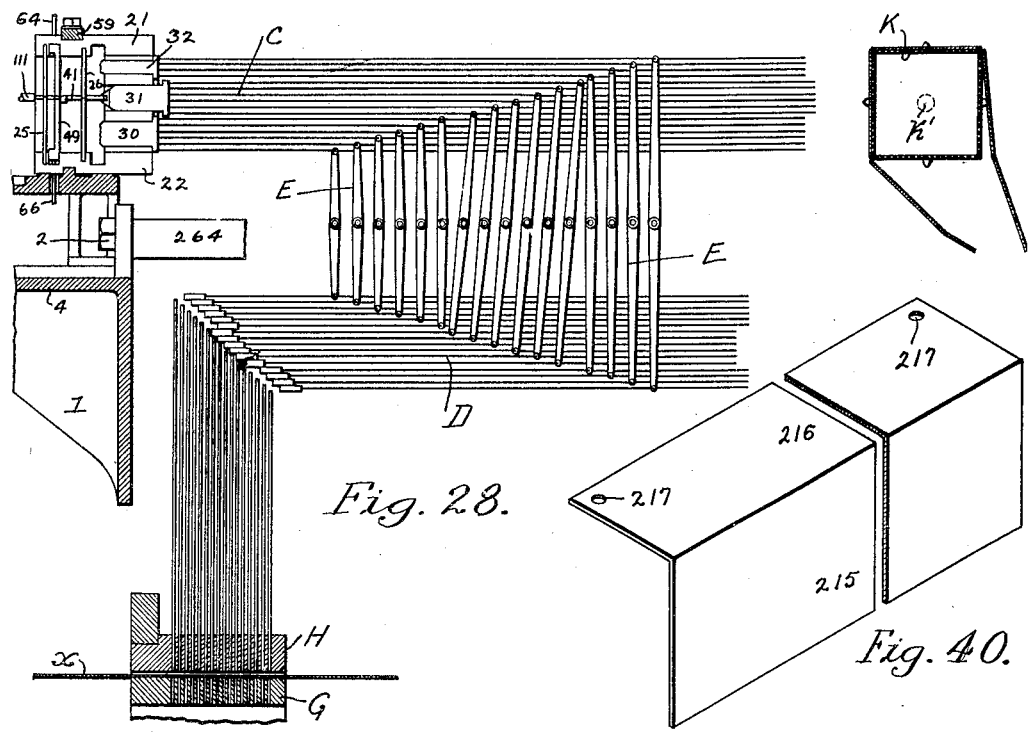
Fig. 28.
Fig. 40.
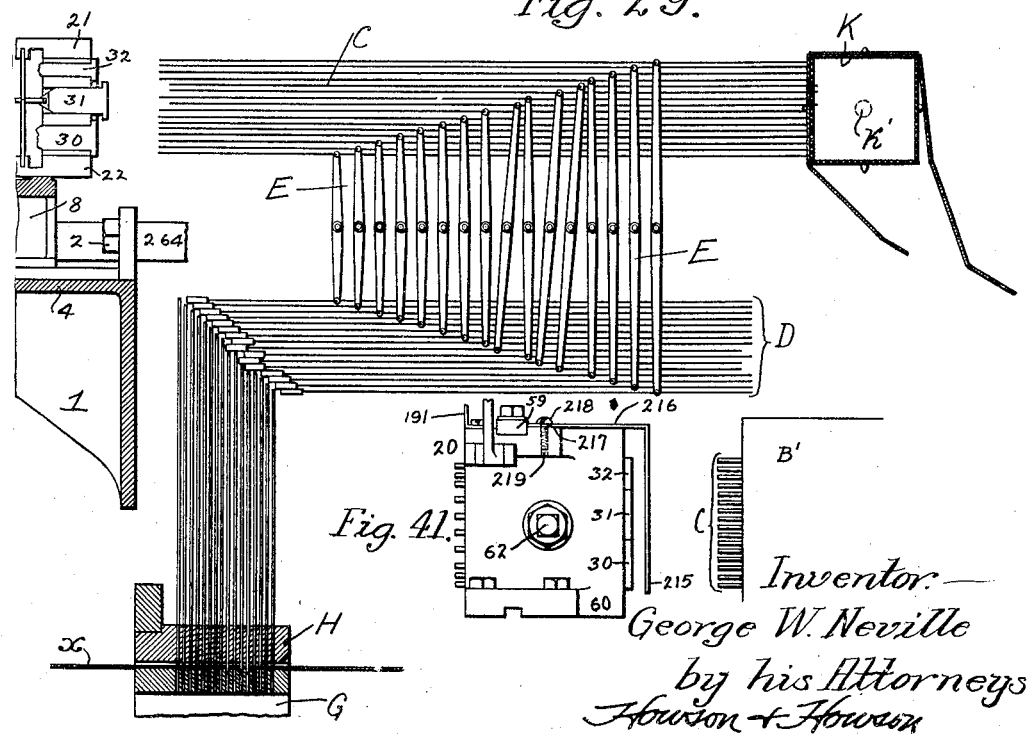
Fig. 29.
Fig. 41.
Inventor:
George W. Neville
by his Attorneys
Howson & Howson

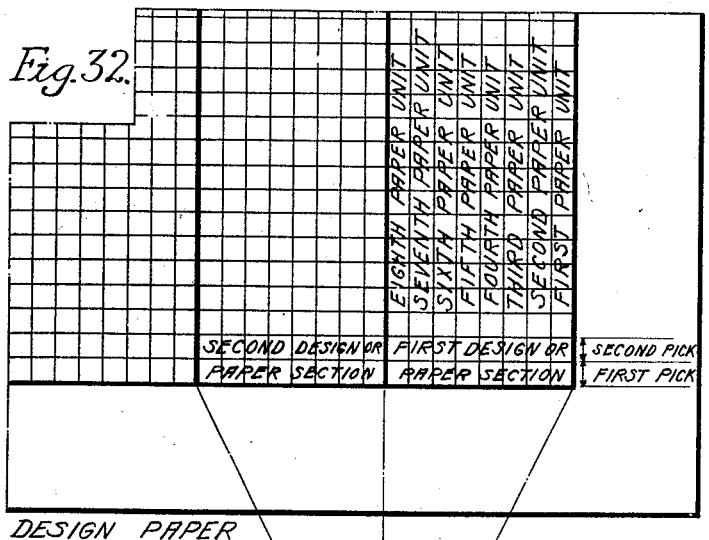
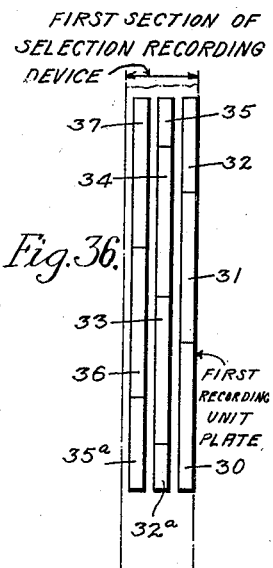
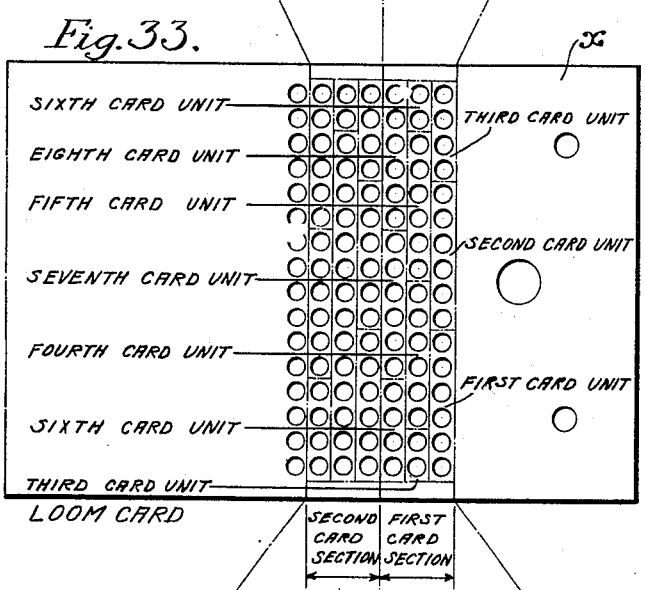
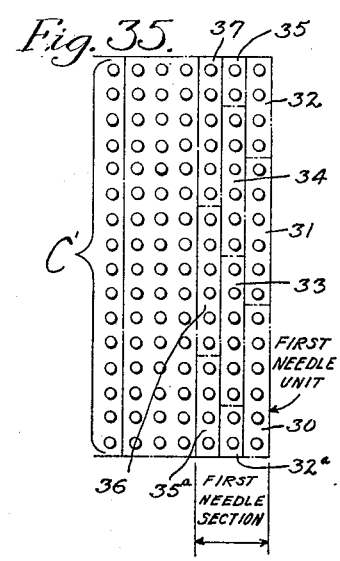
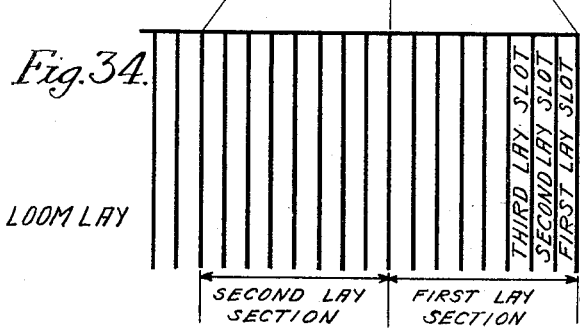

Oct. 22, 1929.  G. W. NEVILLE,  1,732,982
JACQUARD CARD PUNCHING MACHINE
Filed Oct. 3, 1927  14 Sheets-Sheet 14
Fig. 37.
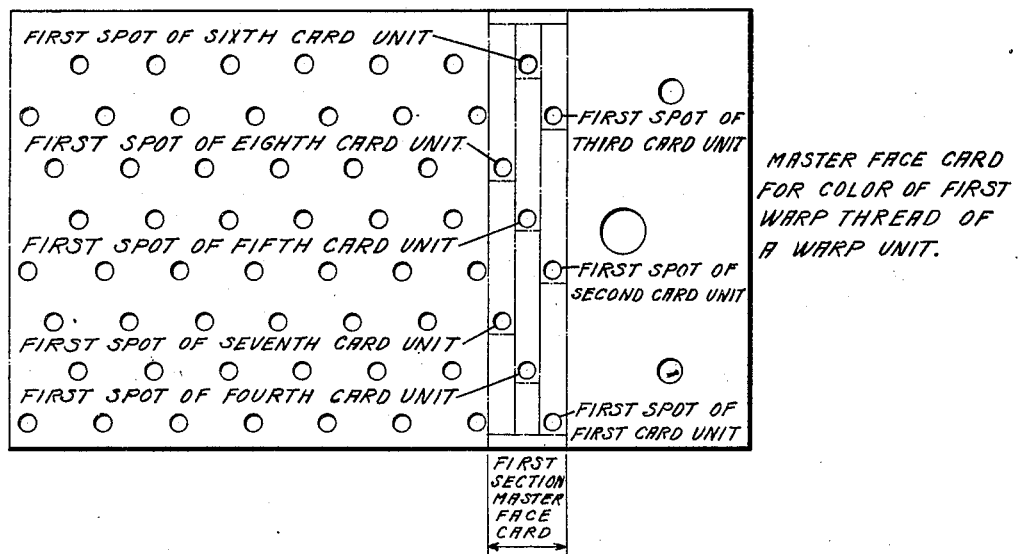
MASTER FACE CARD
FOR COLOR OF FIRST
WARP THREAD OF
A WARP UNIT.
Fig. 38.
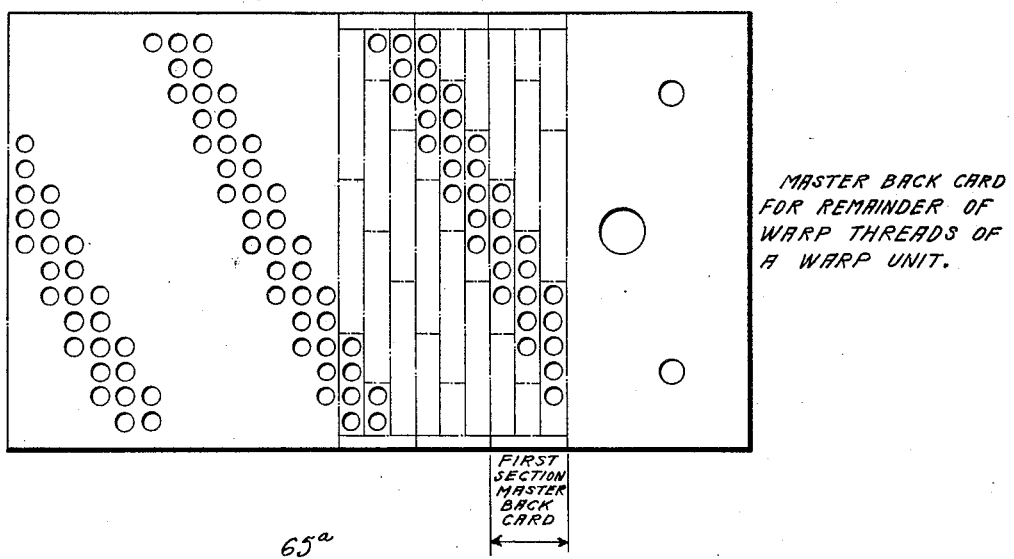
MASTER BACK CARD
FOR REMAINDER OF
WARP THREADS OF
A WARP UNIT.
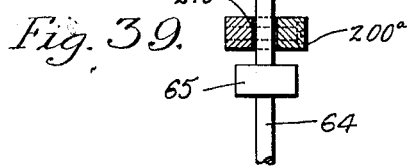
Fig. 39.
Inventor
George W. Neville
by his Attorneys
Howson & Howson Patented Oct. 22, 1929

1,732,982

UNITED STATES PATENT OFFICE

GEORGE W. NEVILLE, OF PHILADELPHIA, PENNSYLVANIA, ASSIGNOR OF ONE-HALF TO GEORGE ROYLE, JR., OF PHILADELPHIA, PENNSYLVANIA

JACQUARD CARD-PUNCHING MACHINE

Application filed October 3, 1927. Serial No. 223,720.

This invention relates to apparatus for punching the cards employed in the jacquard mechanisms of looms which are adapted to weave textile fabrics.

The principal object of the invention is to provide mechanism in the form of an attachment which may be readily applied to what is generally known to the art as a "fine index repeater", similar to that shown and described in United States Letters Patent No. 304,864, dated September 9, 1884.

The mechanism comprising my invention and the process involved makes possible the punching of cards for the weaving of tapestry having the most elaborate and intricate designs on looms which are generally adapted to weave only ordinary fabrics having the simpler designs.

Such looms are provided with what is known to the art as the universal or straight tie-up for the warp operating harness cords, whereas, it is the general practice, necessitated by the difficulty of punching the cards, to employ in looms which are adapted to weave tapestry a special harness tie-up, generally known to the art as the sectional tie-up. Both arrangements of the harness, and the limitations they respectively place on the looms, are well known to those familiar with the art.

By making it possible to weave tapestry on looms employing the straight tie-up, these limitations are obviated and, therefore, a manufacturer need not provide the special sectional tie-up in any of his looms for the weaving of tapestry, therefore, he need not have any of his looms lying idle if he has no orders for tapestry, or vice versa.

Tapestry has been woven on looms employing the straight tie-up prior to the conception of my invention, but the cost of punching the cards has made such practice prohibitive heretofore, as the operation required special intricate machinery and a number of operators therefor. By the adoption of my apparatus and process for punching the cards, the cost of the production of any given set of cards is greatly reduced as compared with the cost of production of a similar set of cards by any of the methods and apparatuses heretofore employed, and requires but a single operator, who does not necessarily have to be of a highly skilled type.

By the adoption of the principles involved in my invention, the scope of possible design is unlimited, whereas, under the methods generally employed, the scope of the design is limited in accordance with the ability of the card punchers to remember the design supervisor's instructions, relative to the tie-in of the warp threads during the operations involved in the punching of a set of cards. This condition is also a recognized and accepted fact in the art. I overcome this limitation by the employment of master cards to be used on the above mentioned card repeating machine in conjunction with my attachment.

According to the process to be followed when employing my attachment for cutting a set of cards for any given design, regardless of how simple or how intricate it may be, the card puncher first cuts a string of master cards according to the supervisor's instructions for each color appearing in the design, which has been plotted by the designer in the well known manner.

These instructions, as is well known, set forth an anticipated plan for tying-in the warp threads, which would otherwise form what are known as floats on the opposite faces of the fabric, when any one warp end is repeatedly called for in the design in a line extending longitudinally of the fabric, and the other warp ends which pass through the same slot in the lay of the loom are carried to the back of the fabric.

These instructions show that the warp ends of different colors are each to be tied in at staggered intervals, for example, some of the warp ends may be tied in at every fourth pick of the loom, while others may be tied in at every other pick, &c. These instructions are recorded on the master cards for the respective colors, the master card for any definite color being placed in the machine when the card puncher is punching that particular color on the string of loom cards, thus the card puncher is relieved of the necessity of remembering the instructions and above mentioned limitation of the scope of possible design is thereby eliminated.

After the card puncher completes the punching of the string of loom cards for one color, the string of master cards for that color is removed from the machine and the string of master cards for the next color to be punched is inserted in its place. The string of loom cards is then started through the machine and the next color, corresponding to the color represented by the master cards just placed in the machine, is punched.

The details of construction of the attachment forming the subject of this application and sufficient of the construction of the repeating machine to enable one skilled in the art to thoroughly understand the cooperation of these mechanisms will be disclosed hereinafter, reference being had to the accompanying drawings, of which:

Fig. 3 is a right side elevation of my attachment;

Fig. 4 is a longitudinal sectional elevation of my attachment;

Fig. 5 is a front elevation of my attachment;

Fig. 6 is a plan view of my attachment;

Fig. 8 is an enlarged plan view of the selector carriage;

Fig. 12 is a right side elevation of one of the selection recording units and showing the attachment frame in section;

Fig. 13 is a rear elevation of the mechanism shown in Fig. 12;

Fig. 14 is a sectional elevation taken on the line 14—14, Fig. 12;

Fig. 15 is a sectional elevation taken on the line 15—15, Fig. 12;

Fig. 16 is a sectional perspective view of the selector carriage;

Figure 1:
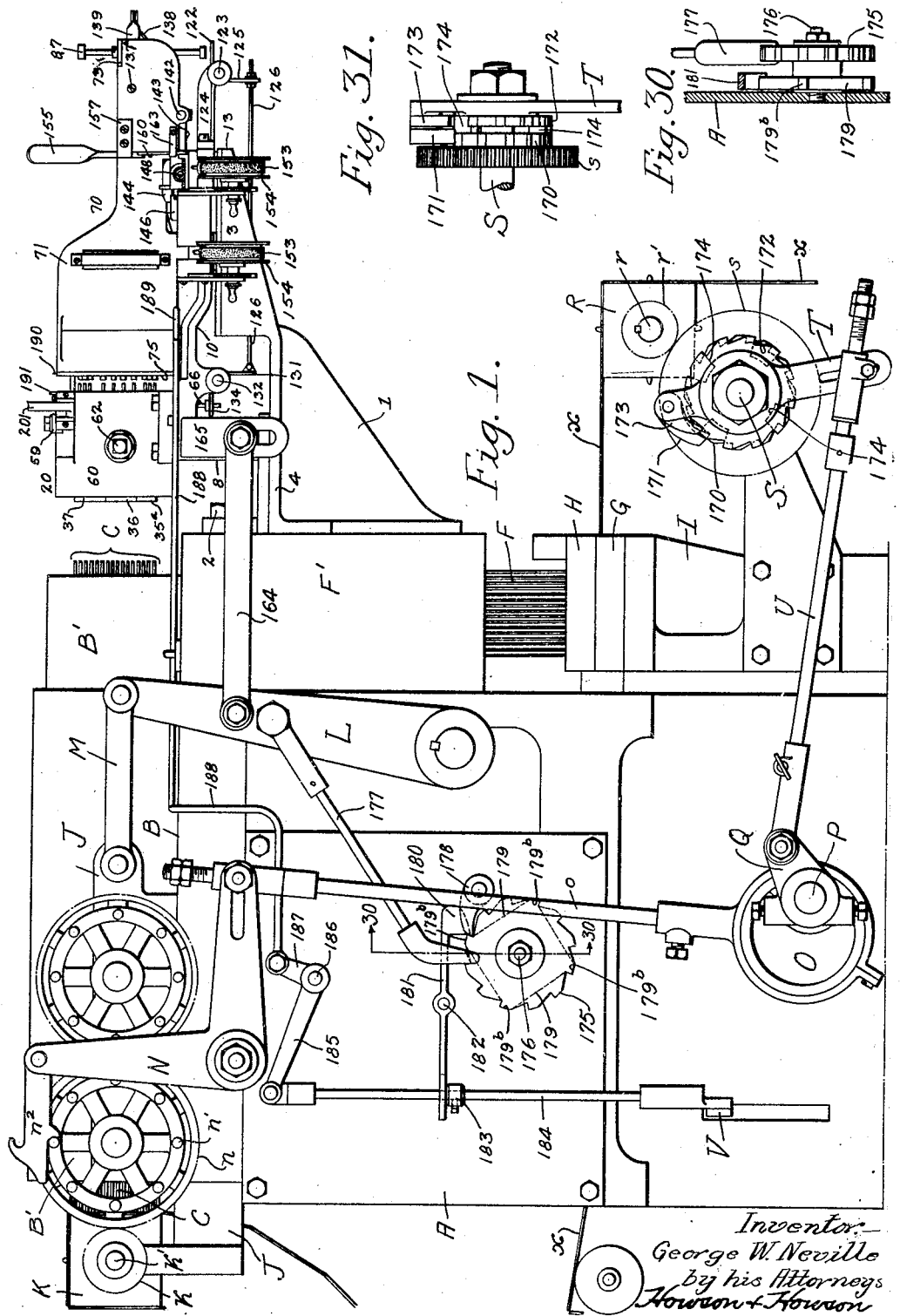
Fig. 1 is a left side elevation of the main portion of the card repeating machine above mentioned, showing the attachment, constructed in accordance with the principles of my invention, applied thereto.
Figure 2:
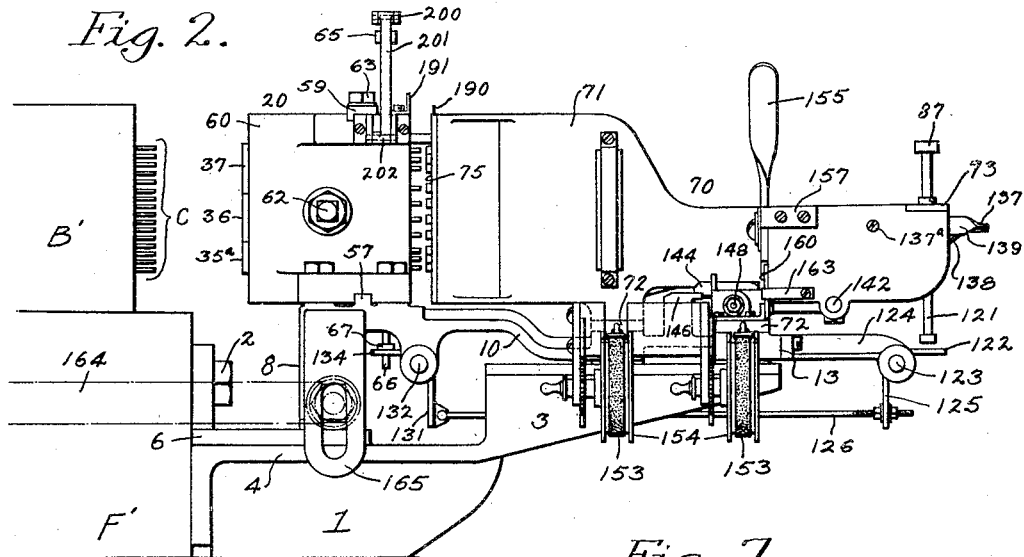
Fig. 2 is a similar left elevation of my attachment drawn to a slightly enlarged scale.
Figure 7:
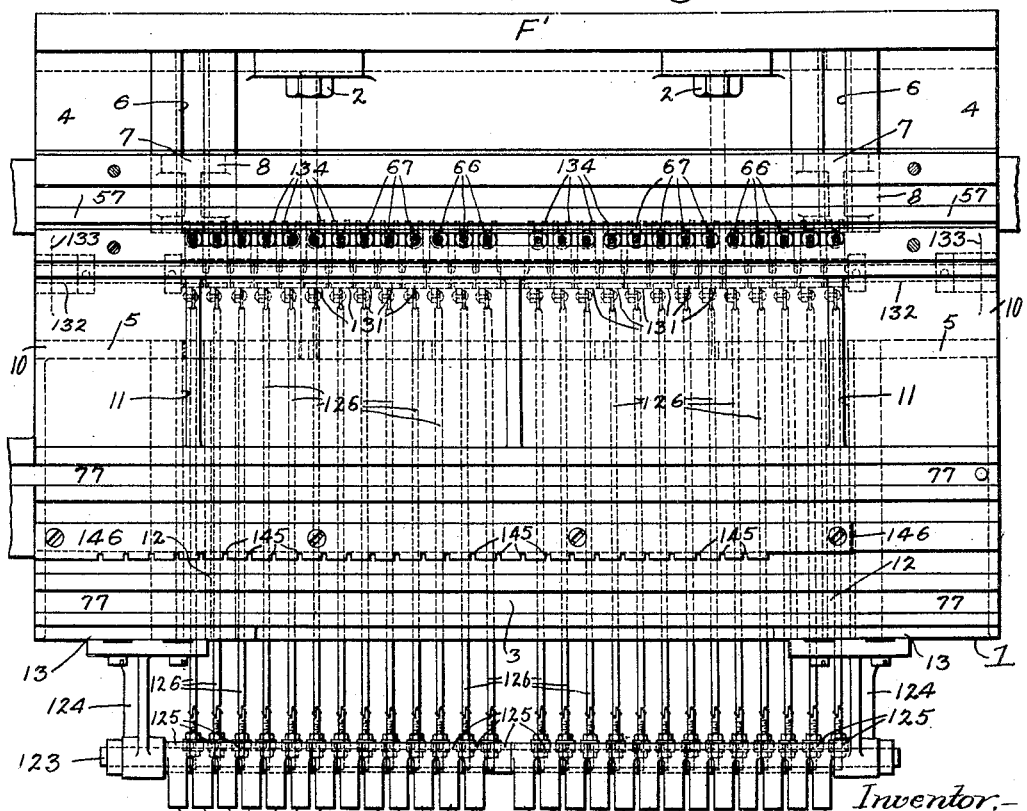
Fig. 7 is a plan view of my attachment with the selector carriage and associated mechanism removed.
Figure 10:
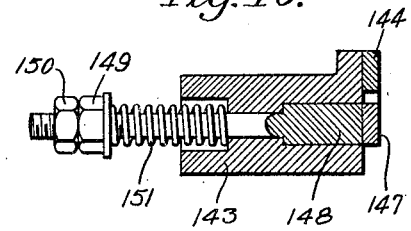
Fig. 10 is a sectional elevation taken on the line 10—10, Fig. 8.
Figure 11:
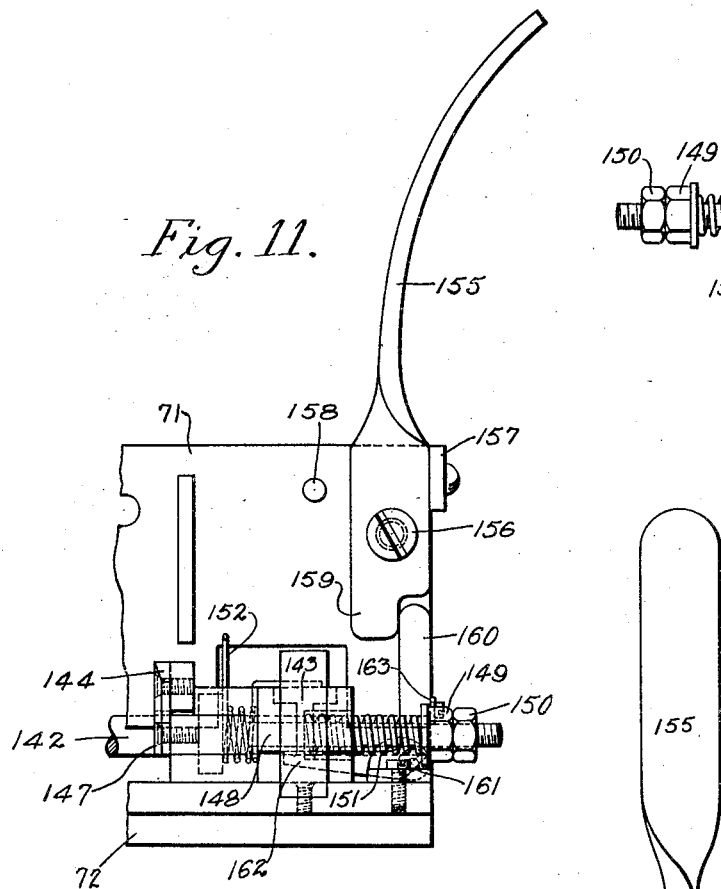
Fig. 11 is a rear elevation of the mechanism shown in Fig. 9.
Figure 9:
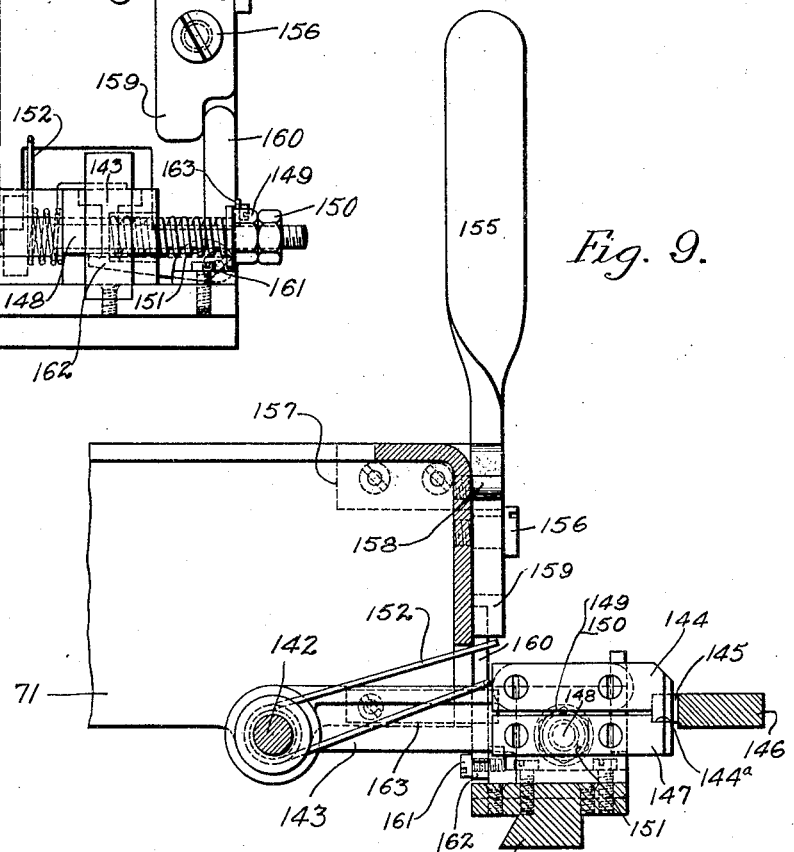
Fig. 9 is a sectional elevation taken on the line 9—9, Fig. 8.

Figs. 17 to 26 constitute a detached perspective view of one of the selection recording units;

Fig. 27 is a longitudinal sectional elevation of my attachment, and diagrammatically shows the cooperating elements of the repeating machine in one position relative thereto;

Figs. 28 and 29 are views similar to Fig. 27, but showing the cooperating element of the attachment and the repeating machine in different operating positions;

Fig. 30 is a sectional view taken on the line 30—30, Fig. 1;

Fig. 31 is a view of a detail of the invention;

Fig. 32 is a diagrammatic illustration of a portion of the design paper;

Fig. 33 is a diagrammatic illustration of a portion of a loom card;

Fig. 34 is a diagrammatic illustration of a portion of the lay of a loom;

Fig. 35 is a diagrammatic illustration of a portion of the series of punch controlling needles of the card repeating machine;

Fig. 36 is a diagrammatic illustration of one section of the selection recording device;

Fig. 37 is a diagrammatic illustration of a portion of a master face card;

Fig. 38 is a diagrammatic illustration of a portion of a master back card;

Fig. 39 is a sectional elevation of a modified form of locking plate releasing means.

Fig. 40 is a perspective view of a needle neutralizing plate adapted to be placed on the selection recording device when the machine is used as a repeater; and Fig. 41 illustrates the neutralizing plate in place.

The repeating machine above referred to comprises a main frame A, on top of which is rigidly mounted a bed plate B. The bed plate B is provided with vertically extending projections $B^1$ in which are slidably mounted a series of punch controlling needles C. A series of punch locking rods D (see Fig. 27) are slidably mounted in the frame of the machine, parallel with and spaced below the series of controlling needles C. A series of levers E respectively and cooperatively connect the individual controlling needles C with the individual punch locking rods of the series D, as shown in Figs. 27, 28 and 29. A series of punches F is vertically and slidably mounted in a punch head $F^1$ on the frame of the machine adjacent one end of the locking rods D, and these punches F cooperate with a die plate G and a stripper plate H.

The loom cards to be punched are indicated at X, and pass between the die plate G and the stripper plate H, as shown in the said figures of the drawings.

The die plate G and stripper plate H are mounted on a punch head I which is reciprocally mounted in a vertical position on the frame A.

Slidably mounted on the bed plate B is a reciprocating frame J, on one end of which is rotatably mounted a card cylinder K.

When the machine is operated as a repeater, the set of cards to be repeated pass around this cylinder and are successively moved against the needles C when the frame J is moved in a direction to cause the cylinder K to approach the needles C. The ends of the punch locking rods D, adjacent the punches F, normally lie over the said punches F. The cylinder K is provided with a series of perforations, one for each needle, and the holes in the cards which are being repeated register with the holes in the cylinder. Where no hole appears in the card, the corresponding needle C is moved longitudinally and through the lever E, withdraws the punch lock D from above the punch F. The die G is then raised and the punches F, over which the locking rods D remain, are held against vertical movement and punch holes in the card overlying the die G corresponding with the holes in the card on the cylinder K which has been pressed against the needles C. The die G then recedes and the reciprocating frame J is moved in an opposite direction causing an "evener", which is located at the end of the frame J opposite to that occupied by the cylinder K, to engage the opposite ends of the needles C, and thus cause all the punch locking rods D to be moved again to their normal positions overlying the upper ends of the punches F.

When using the machine to punch original cards in conjunction with my invention, I place the string of master cards, above referred to, on the cylinder K and at the opposite end of the machine, in place of the aforesaid "evener", I place the attachment forming the principal subject matter of my invention.

The design paper illustrated in Fig. 32 is divided into longitudinal sections by heavy lines of which for example, there may be twenty-six in a full design. Each of these longitudinal sections is sub-divided into a series of eight units.

Each of these longitudinal units of the design paper represents six differently colored warp threads, known as a warp unit, and each of these warp units passes through a slot in the reed of the lay of the loom.

The loom card illustrated in Fig. 33 is divided into twenty-six sections, corresponding to the twenty-six sections in the design paper. Each of these card sections contains forty-eight spots and is divided into eight units corresponding to the eight units of each section on the design paper. Each card unit contains six spots, each of which corresponds to one of the differently colored warp threads in a warp unit. Each warp unit of six differently colored threads passes through one of the slots in the reed of the lay of the loom, diagrammatically illustrated in Fig. 34 as above noted.

The first unit of the first card section contains the first six spots starting at the lower right hand corner of the card, as viewed in Fig. 33, and continues along the first vertical line of spots at the right hand side of the card. The second unit consists of the next six spots along this line. The third unit consists of the remaining four spots on this first vertical line and the first two at the lower end of the second vertical line. The fourth unit consists of the next six spots on the second vertical line. The fifth unit consists of the next six spots on the second line. The sixth unit consists of the remaining two spots at the upper end of the second line and the first four spots at the bottom of the third vertical line. The seventh unit consists of the next six spots in the third line, and the eighth unit consists of the last six spots in the said third line, which accounts for all of the forty-eight spots of the first section of the card. The second and the remainder of the twenty-six sections on the card are sub-divided in a manner identical with that described in respect to the first section.

The series of needles C in the card repeating machine contains the same number and correspond in their positions with the number and positioning of the spots on the card and are divided into twenty-six sections, each of which is sub-divided into eight units of six needles each.

Each of the spaces between the transversely extending lines on the design paper represents a "pick" in the fabric. There may be any desired number of weft threads in each "pick" depending upon the character of the fabric being woven. For example, I shall consider a fabric having but two weft threads to a "pick", namely a filling thread and a binder thread, therefore, there will be required two loom cards for each "pick" represented on the design, which for convenience may be termed a face card and a back card. The face card selects the thread of the particular color desired from the warp unit passing through a slot in the loom reed and causes that particular thread to be raised to the face of the fabric, after which the filling weft thread is carried across the loom, in the usual manner. The back card takes care of tying in the other five threads of the warp unit, raising some and permitting others to remain at the bottom of the shed. The card makes its selection after the filling weft thread has been inserted, and after making its selection the binder weft thread is inserted and the whole "beat up" by the lay to form a "pick."

The attachment forming the subject matter of my invention comprises a bracket 1 which is adapted to be secured to the front wall of the punch head F¹ of the card repeating machine by bolts 2. The bracket 1 is of a step formation being provided with an upper step 3 and a lower step 4 which are integrally connected by a vertically disposed tread 5. Adjacent each of its ends, the step 4 is provided with a dovetail slideway 6 extending longitudinally of the machine, and adapted to slidably receive a correspondingly shaped foot 7 formed on the lower end of a leg 8 which is integrally formed on, and adjacent the rear edges 9 of, a longitudinally slidable needle operating carriage 10. The step 3 is provided adjacent its longitudinal side edges, and in line with the slideways 6 of the step 4, with dovetail slideways 11, 11 which are adapted to receive similarly shaped lugs 12, 12 formed on the carriage 10 adjacent the front edge 13 thereof.

On the top face of the longitudinally movable needle operating carriage 10, and overhanging the rear edge 9 thereof, I provide a selection recording device 20 consisting of twenty-six separate recording sections, respectively corresponding to the twenty-six sections on the design paper and the twenty-six sections on the loom card. Each of these recording sections is divided into eight recording units, each of which is adapted to engage the corresponding unit of six of the needles C in a manner hereinafter described.

Adjacent the front of the needle operating carriage 10 is a selector carriage which is adapted to be moved across the machine in front of the individual sections of the selection recording device 20, and to be stopped in front of and in registry with the individual recording units thereof.

The selector carriage is provided with eight selector keys, one for each of the eight recording units of the respective independent sections of the selection recording device.

As above noted, the design paper is divided into longitudinally extending sections, and each of these sections is sub-divided into eight units. Each of these design units is represented by one of the eight selector keys which when pressed will record the selection on the corresponding units of the selection recording device. When the repeating machine is operated, these recorded selections, unit for unit, will be impressed upon the corresponding units of needles C in the machine.

Each section of the selection recording device 20 is operable independent of the other sections of the device, and is independently removable from the needle operating carriage 10.

Each section of the recording device comprises a frame (see Figs. 12 to 24 inclusive) consisting of a top plate 21, a bottom plate 22, a pair of longitudinally extending plates 23 and 24, and a pair of transversely extending plates 25 and 26 secured together to form a rigid framework by means of screws 27.

Horizontally and slidably mounted in grooves 28 formed in the plates 23 and 24 is a series of recording unit plates 30, 31, 32, 32ª, 33, 34, 35, 35ª, 36 and 37.

The positioning of the needles C is identical with the positioning of the spots on the loom card as fully described above, and the recording unit plate 30 is adapted to engage the needles C of the first needle unit comprising needles one to six inclusive, starting at the lower right hand corner of the series of needles and extending vertically along the first or right hand row of the needles, see Fig. 35. The recording unit plate 31 is adapted to engage needles seven to twelve inclusive of the said first row. Recording unit plate 32 is adapted to engage the remaining four needles of the first row, which are needles thirteen to sixteen inclusive. Recording unit plate 32ª is adapted to engage needles one and two starting at the lower end of the second row of needles. Recording unit plate 33 engages needles three to eight inclusive of the second row. Recording plate 34 engages needles nine to fourteen inclusive of the second row. Recording unit plate 35 engages the remaining two needles fifteen and sixteen of the second row. Plate 35ª engages needles one to four of the third row. Plate 36 engages needles five to ten inclusive of the third row, and plate 37 engages needles eleven to sixteen of the third row which completes the needles of one section, as shown in Fig. 35. The remaining recording units engage the remaining needles of the series C in the manner just described in sections consisting of forty-eight needles, each sub-divided into eight units of six needles each.

A series of operating plungers numbered 40 to 47 inclusive are operatively attached to the recording unit plates 30 to 37, respectively. These plungers are horizontally slidably mounted in the transverse plates 25 and 26 of the frame of the respective recording sections. Each plunger is provided with a lug 48 positioned intermediate the plate 25 and a vertically slidable locking plate 49 mounted in grooves 50 and 51 formed in the top and bottom plates 21 and 22 respectively. The locking plate 49 is provided with elongated openings 55 through which the plungers and their lugs 48 are respectively capable of passing. Each plunger is further provided with a pin 52 passing through the plunger and having a collar 53 on the plunger bearing against one side of the pin 52. A spring 54 encircles each plunger and is confined between the collar 53 thereon and the plate 26. The spring 54 in each instance forces the respective plunger outward until the lug 48 thereon engages the rear face of the plate 25.

The lower frame member 22 is provided with a groove 56 for the reception of a key 57 formed integrally with the carriage 10, and the upper frame member 21 is provided with a groove 58 for the reception of a retaining bar 59. The retaining bar 59 extends across all of the sections of the selection recording device, and is secured at its opposite ends to upright end brackets 60, 60 which are secured to the carriage 10.

Between each of the end brackets 60 and the outermost recording section frame is a pressure plate 61. A pressure screw 62 extends through each of the end brackets 60 and bears against the pressure plate 61. By adjusting the screws 62, 62, the recording sections can be properly aligned with the needles C of the repeating machine. The retaining bar 59 is secured to end brackets 60, 60 by means of screws 63, 63, and by removing these screws and the bar 59 and by backing off the end screws 62, 62 any number of the recording sections may be removed for inspection or repair without disturbing the other sections.

A rod 64 is secured to the upper end of each locking plate 49 and extends through an aperture formed in the upper section frame member 21. A finger pad 65 is formed on the upper end of the rod 64. A second rod 66 is secured in the lower end of each locking plate 49, and extends through an aperture formed in the lower section frame member 22 and an aperture formed in the carriage 10. A collar 67 is secured to the rod 66.

In making a selection, when any of the selector keys are pressed, the corresponding plungers 40—47 are operated and move the attached recording unit plates 30—37 to the position illustrated in Fig. 27, the lugs 48 on the operated plunger moving through the elongated openings 55 in the lock plate 49. The lock plate 49 is then raised by pressure being applied to the lower rod 66, and the lugs 48 are then held at the rear side of the lock plate 49, which causes the corresponding recording unit plates to be held in their projected positions. To release the rods 40—47, the lock plate is moved downward by pressure being applied to the upper rod 64 whereupon the lugs 48 are forced through the openings 55 in the lock plate 49, by their springs 54 causing the recording unit plates 30—37 to be retracted.

The selector carriage 70 comprises side frames 71, 71 suitably connected by lower bars 72, 72, front bars 73 and 74 and rear plates 75, 75. The lower bars 72, 72 are provided with dovetail tongues 76, 76 adapted to slide within similarly shaped slides 77, 77 formed on the upper face of the needle operating carriage 10. The slides 77, 77 extend the full width of the carriage 10, as shown in Fig. 6.

Vertically and slidably mounted in the front bars 73 and 74 are the eight selector keys above referred to and numbered 80, 81, 82, 83, 84, 85, 86 and 87 respectively. The shank 88 of each selector key is slotted at 89 for the reception of one end 90 of a selector lever 91. There are eight selector levers 91, one for each selector key. The selector levers 91, 91 are pivotally mounted on a rod 92 secured in the side frames 71, 71 of the selector carriage 70. The other end of each lever 91 is operatively connected by a link 93 with a lever 94. The levers 94 are each secured to one of a series of rock shafts 100, 101, 102, 103, 104, 105, 106 and 107. The rock shafts 100—107 are each provided with a second lever 108 connected respectively by link 109 to a series of horizontally slidable selector plungers 110, 111, 112, 112$^a$, 113, 114, 115, 115$^a$, 116 and 117 mounted for axial movement in the rear plates 75, 75 of the selector carriage frame 70.

The selector plunger 110 is operated from the selector key 80 by the lever 91, rock shaft 100 and link 109, and is adapted to engage the recording plunger 40 of the recording unit plate 30. The selector plunger 111 is operated by the selector key 81 and rock shaft 101, and engages the recording plunger 41 of the recording unit plate 31. The selector key 82 operates the rock shaft 102 and the lever 108 thereon is connected by a link 109$^a$ to a yoke 118 which operatively connects the selector plungers 112 and 112$^a$, therefore, when the selector key 82 is pressed the selector plungers 112 and 112$^a$ are caused to engage the recording unit plungers 42 and 42$^a$, and thereby project the recording unit plates 32, 32$^a$ which constitute the third recording unit of the recording section. The selector plunger 113 is operated by selector key 83 and rock shaft 103, and engages the recording plunger of the recording unit plate 33. The selector plunger 114 is operated by selector key 84 and rock shaft 104, and engages the recording plunger 44 of the recording unit plate 34. The selector plungers 115, 115$^a$ are operated by selector key 85 through rock shaft 105, and engage the selection recording plungers 45 and 45$^a$ of the recording unit plates 35, 35$^a$ which constitute the sixth recording unit of the recording section. The selector plungers 115 and 115$^a$ are operatively connected by a yoke 118$^a$ which is connected by a link 109$^a$ to the lever 108 on the rock shaft 105. The selector plunger 116 is operated by the selector key 86 and rock shaft 106, and engages the recording plunger 46 of the recording unit plate 36. The selector plunger 117 is operated by the selector key 87 through the rock shaft 107, and engages the recording plunger of the recording unit plate 37.

Each of the selector levers 91 is engaged by a flat spring 119, one end of which engages the lever to the rear of its pivot 92 and thereby returns the selector key and the elements controlled thereby to their normal positions when pressure is released from the selector key. The opposite end of the spring 119 is secured to a bar 119$^a$, which extends between the side frames 71, 71 of the selector carriage 70.

When the card puncher makes a selection by pressing certain of the selector keys 80—87, the corresponding recording unit plates are operated as above noted, and these elements of the particular recording section of the selection recording device are locked in place by upward movement of the locking plate 49 of this particular section. This operation is accomplished while the operator retains the selector keys in their depressed positions, by means of a locking key 120 mounted and guided for vertical movement in the front bars 73 and 74 of the selector carriage 70. The lower end of the shank 121 of this locking key 120 engages one arm of a bell-crank lever which is pivotally mounted on a bar 123 held in a bracket 124 secured to the front edge 13 of the needle operating carriage 10. The second arm 125 of the bell-crank lever is attached to one end of a rod 126 which extends longitudinally of the carriage 10 and is operatively connected at its opposite end to one arm 131 of a second bell-crank lever which is pivotally mounted on a bar 132 held in lugs 133 formed on the bottom of the carriage 10. The other arm 134 of this bell-crank lever engages the collar 67 on the lower rod 66 of the locking plate 49.

In the shank 121 of the locking key 120 is formed a slot 121$^a$ which is adapted to receive a lug 136 rigidly secured to the under side of a locking bar 137 extending completely across the selector carriage 70. The bar 137 is pivotally attached to the side frames 71, 71 of the carriage 70 at 137$^a$, the pivot apertures being formed in levers 139 formed integral with and at the opposite ends of the locking bar 137. The locking key and locking bar are maintained in an inoperative position by a flat spring 138 engaging the under side of the lug 136 and having its one end secured to the cross bar 74.

Obviously there is one of the locking devices, comprising the bell-crank levers 122—125 and 131—134 and a connecting rod 126, for each section of the selection recording device and the locking key shank 121 is adapted to register with the arm 122 of the section with which the selector carriage 70 is aligned.

The selector carriage 70 in its movement from alignment with one of the recording sections to the next adjacent section is controlled by an escapement mechanism which in turn is under control of a stepping key 140, which is mounted for vertical movement in the front bars 73 and 74 of the selector carriage 70, and engages the free end of a lever 141. The lever 141 is secured to a shaft 142 rotatably mounted in the side frames 71, 71 of the carriage 70.

Secured to the shaft 142 is a lever 143 on the free end of which is rigidly secured an escapement blade 144. The escapement blade 144 is adapted to move into and out of a series of notches 145 formed in one edge of an escapement bar 146 which is rigidly attached to the needle operating carriage 10. The notches 145 are spaced equally and in accordance with the spacing of the separate sections of the selection recording device 20.

The escapement lever 143 is also provided with a laterally movable escapement blade 147 which is secured to one end of an escapement plunger 148 which is slidably mounted in the free end of the escapement lever 143. An adjustable stop nut 149 and a lock nut 150 therefor are mounted on the opposite end of the escapement plunger 148 outside the arm 143 and spaced therefrom a distance substantially equal to the distance between the notches 145 in the escapement bar 146. A spring 151 encircles the plunger 148, and is confined thereon between the stop nut 149 and the lever 143. A torsion spring 152 encircles the shaft 142 and tends to maintain the escapement blade 144 in the notches 145.

The selector carriage 70 is moved in one direction across the needle operating carriage 10 by means of tapes 153, 153, wound around spring loaded drums 154, 154 of any desired construction, these drums being rotatably mounted at one side of the carriage 10, the free ends of the tapes 153 being suitably attached to the bottom bars 72, 72 of the selector carriage 70.

When it is desired to move the selector carriage 70 from one section of the selection recording device 20 to the next adjacent section, toward the left, as viewed in Fig. 6, the operator presses the stepping key 140 which rocks the shaft 142 causing the arm 143 to be rocked to such an extent that the lower point 144$^a$ of the escapement blade 144 is raised above the top of the bar 146 out of the notch 145 therein, and the laterally movable blade 147 is placed in the said notch. The spring loaded drums 154, through the tapes 153, cause the carriage 70 to be moved laterally until the side of escapement arm 143 engages the stop nut 149 on the escapement plunger 148. The blade 144 is then in alignment with the next notch 145 in the bar 146 which it enters, under the influence of the torsion spring 152. As the blade 144 moves downward into its newly occupied notch 145, the blade 147 moves downward in the old notch until its upper edge is below the lower surface of the bar 146 whereupon the laterally movable blade 147 is moved toward the arm 143 by the spring 151, and into alignment with the notch 145 newly occupied by the blade 144.

When it is desired to move the selector carriage 70 toward the right, as viewed in Fig. 6, both the blades 144 and 147 are raised to a position clear of and above the bar 146 by means of a return handle 155. The return handle 155 is pivotally mounted on one of the side frames of the carriage 70 as at 156 and is movable between limit stops 157 and 158 thereon. The lower end 159 of the handle 155 engages one arm 160 of a bell-crank lever which is pivoted at 161 to the frame member 71, the second arm 162 of the bell-crank lever underlying the escapement arm 143. When the return handle 155 is operated the escapement arm 143 is raised until the lower edge of the laterally movable escapement blade 147 is clear of and above the escapement bar 146. The elements resume their normal positions when the handle 155 is released, by the action of the spring 152. The handle 155 is retained in its normal inoperative position against the stop 157, by the action of a spring 163, which engages the crank arm 160.

The needle operating carriage 10 is moved toward and away from the adjacent ends of the needles C by means of an oscillating arm L forming one of the elements of the repeating machine, being connected thereto by means of links 164 pivotally attached at one end to the said oscillating arm L and at their opposite ends to lugs 165, 165 formed integrally with the opposite sides of the carriage 10.

The oscillating arm L is connected by a link M to the reciprocating frame J which carries the card cylinder K, and effects the movement of the cylinder K toward and from the needles C. The card cylinder K is intermittently rotated by the ordinary mechanism forming no part of the present invention, and comprises a gear $k$ on the shaft $k^1$, which supports the cylinder K in the frame J. The gear $k$ meshes with a gear $n$ rotatably mounted on the frame J, and being provided with pins $n^1$ adapted to be engaged by a pawl $n^2$ on a bell-crank lever N. The bell-crank lever N is rocked by an eccentric O secured to one end of the continuously rotating shaft P of the repeating machine, the lever N and the eccentric O being operatively connected by a rod $o$.

On the shaft P is also provided a crank arm Q, which effects intermittent rotation of a card cylinder R which draws the string of loom cards X through the machine. The cylinder R is secured to a shaft $r$ on which is also secured a gear $r^1$ which meshes with a gear $s$ on a shaft S carried by bracket on the vertically reciprocable frame I. Attached to the gear $s$ is a ratchet wheel 170 with which a pawl 171 cooperates. The pawl 171 is carried by a rocker arm T which is operatively connected by a rod U with the crank arm Q. Loosely mounted on the shaft S is a second ratchet wheel 172 which cooperates with a pawl 173 on the rocker arm T. The pawl 171 is of greater width than the face of the ratchet wheel 170, and projects beyond that side of the said ratchet wheel adjacent the ratchet wheel 172. The ratchet wheel 172 is provided with a plurality of lugs 174 which extend into the space between the two ratchet wheels and are adapted to engage the pawl 171 at intervals and raise it clear of the teeth of the ratchet wheel 170, thus causing the said ratchet wheel and the gear $s$ to miss one intermittent movement out of every three such movements of the ratchet wheel 172 for reasons explained hereinafter.

The main control lever of the repeating machine, by means of which the machine is stopped and started, is illustrated at V. I have provided means for automatically operating this lever to stop the machine after every third reciprocation of the frame J. This means comprises a ratchet wheel 175 rotatably mounted on a stud 176 secured in the machine frame A. A pawl 177, which is pivotally mounted on the oscillating arm L of the machine, engages the teeth of the ratchet wheel 175 and moves it in intermittent steps, one tooth at a time, a detent 178 preventing backward rotation of the ratchet wheel. On one side of the ratchet wheel 175 is a cam wheel 179 having suitably spaced lobes 179$^b$ which are adapted to engage, successively, a lug 180 on one end of a lever 181 pivoted at 182 to the machine frame A. The opposite end of the lever 181 engages a collar 183 on a vertical rod 184, one end of which is pivotally attached to the operating or control lever V, the opposite end of the rod being pivotally attached to one arm 185 of a bell-crank lever, which is pivoted at 186 to the frame A. The second arm 187 of this bell-crank lever has one end of a shift rod 188 attached thereto. The opposite end of the rod 188 is provided with a hand grip 189, located in easy reach of the operator at the front end of the machine.

For the purpose of illustrating the operation of the card repeating machine with my attachment applied thereto let it be assumed that the design, as plotted by the designer, employes a six color warp. The warp, therefore, is divided into separate units, each of which contains one thread of each color. Each of these warp units passes through an individual slot in the lay of the loom.

The design, after it has been plotted, is passed on to the supervisor, who prepares what is generally known as an instruction sheet. On this instruction sheet is the plan for tying in each of the six warp threads appearing in the design. It is generally known and here noted that each color occupies a similar position in each of the warp units, the card units and the needle units of the repeating machine. For example, the first color of each warp unit may be brown, therefore, the first spot in each card unit will represent brown, and the first needle in each needle unit will represent brown. The other five colors of each warp unit will be similarly represented in each unit throughout the entire card, etc., and this arrangement is maintained throughout the whole procedure of punching the cards and the weaving of the fabric. The harness cords of the loom are divided into similar units of six each. The cord controlled by the first spot of each unit of the loom card will control the first thread of each warp unit in the loom &c.

The plotted design and the instruction sheet are then passed to the card puncher, who proceeds to punch a string of master cards for each color, and in accordance with the supervisor's instructions. The supervisor's instructions also indicate the number of weft threads employed in the weaving of the fabric. For the purpose of illustration, I have assumed that there are but two weft threads, consequently there are two master cards to be punched for each color in the warp namely the "face" card and the "back" card. This is for the reason that when each of the weft threads is passed across the loom certain warp threads must be raised and others lowered, to form an open shed for the reception of the weft thread.

On the master "face" card for each color the spots on the card, which represent the particular color at hand, are punched. For example, the first warp thread of each warp unit is brown, therefore, on the master face card for brown the first spot in each unit on the card will be punched. If the second warp thread of each warp unit is red then on the master face card for red the second spot of each unit throughout the card will be punched, and so on for each of the master face cards for each differently colored warp thread in a warp unit.

The "back" card associated with each "face" card for each differently colored warp thread of the warp units are punched in accordance with the supervisor's instructions. For example, on the "back" card associated with the "face" card for the first warp thread (brown) the instructions may read "Cut 1 miss two on red, blue, black, ecru and gold". That means that for each of these colors the card puncher will punch the spot representing each of the respective colors in one unit and then will miss that spot on the next two units. As there are two hundred and eight spots on the card for each color and the operator is punching in multiples of three, which cannot be divided evenly into two hundred and eight, these instructions are carried on in the given order onto three cards before a repeat is obtained. The master cards are, therefore, assembled in the following manner, a face card, a back card and a blank card; then a second face card, the same as the first face card, a second back card which constitutes a continuation of the first back card, and a second blank card; then a third face card like the other two, a third back which constitutes a continuation of the second back card and incidently a conclusion of one order of the instructions, and then a third blank card. The opposite ends of the assembled string of cards are then joined to form an endless band.

Having completed and assembled a string of master cards for each color in the warp, the card puncher places the string of master cards for brown on the cylinder K of the repeating machine with the blank card which precedes the first face card in line with the ends of the needles C¹. The unpunched string of loom cards X is started through the machine, by placing the first one thereof on the card cylinder R.

The operator then places the plotted design in a convenient position before him, and by grasping the handle 155 of the selector carriage 70 moves the selector carriage to the extreme right hand side of the needle operating carriage 10. A pointer 190 on the selector carriage 70, registering with the first section of the selection recording device 20, is indicated on a scale 191 extending across the said selection recording device 20.

The design is read from the right hand side along the first or bottom transversely extending line of blocks of the cross hatched design paper. As above noted, these transversely extending lines of blocks are divided into sections, by heavy vertical lines and each section is divided into eight units by lighter vertical lines, each unit being represented by a selector key on the selector carriage 70.

The card puncher by glancing at the design paper can readily tell which of the unit blocks of the first section of the design contains "brown". He then presses the corresponding selector keys 80—87 with the fingers of both hands, holding them in this position, and with one of his thumbs presses either the locking key 120 or the transversely extending locking bar 137.

Pressing of the desired selector keys, through the cooperating lever 90, link 93, lever 94, rock shaft 100—107, link 109, operates the corresponding selector plunger 110—117, projecting the said selector plunger rearwardly into contact with the axially aligned recording plungers 40—47.

The said recording plungers 40—47 are moved rearwardly by the selector plungers 110—117 to a position wherein the lug 48 on each recording plunger is located to the rear of the locking plate 49, which causes the corresponding recording unit plates 30—37 to be projected rearwardly, see Fig. 27. While the recording plungers 40—47 are held in this position the operator presses the locking key 120, or the equivalent bar 137, which causes the lower end of the shank 121 of the locking key 120 to engage the arm 122 of the bell-crank lever 122—125, rocking the same on its pivot 123 and causing the rod 126 to receive a longitudinal movement, which rocks the bell-crank lever 131—134 on its pivot 132, and causes the arm 134 thereof to move the rod 66 vertically. Vertical movement of the rod 66 effects a similar movement of the locking plate 49 causing the elongated apertures 55 of the said locking plate to move upward around the recording plungers until the lower ends of the said apertures are above the lower edges of the lugs 48 on the plungers 40—47, which retains the said recording plungers 40—47 and their associated recording unit plates 30—37 in their rearwardly projected positions. The selection is thereby recorded, and the operator is free to release those of the selector keys 80—87 which he had pressed.

By pressing the shift key 140, the escapement mechanism of the selector carriage 70 is operated to effect a movement of the said carriage into registry with the second section of the recording device 20, after which the operator makes the selection of all the unit blocks in the second section of the design paper which contain brown. This operation is repeated until each of the twenty-six sections of the first transverse line of design has been read and subsequently recorded by the selection recording device 20.

The operator then pulls the starting rod 188 which raises the kick-off rod 184 and the starting lever V vertically, thereby starting the repeating machine in operation and causing the arm L to oscillate in a direction toward the needles C, the blank card engaging all the said needles and moving them into a position wherein all the punch locking rods D are removed from above their corresponding punches, see Fig. 27.

The direction of movement of the arm L is then reversed, causing the card cylinder K to move away from the said needles and the needle operating carriage 10, and consequently the selection recording device 20 to be moved in a direction toward the opposite ends of the needles C. The needle operating carriage 10 continues to advance toward and the ends of the needles C and the projecting plates of the selection recording device 20 finally engages the units of needles C which are in alignment with the said projected recording unit plates. Continued movement of the needle operating carriage 10 causes the said projected recording unit plates to move the engaged units of needles C longitudinally. This longitudinal movement of the needles C causes the corresponding punch locking rods D to be projected over the respective punches F with which they cooperate (see Fig. 28).

During the movement of the card cylinder K away from the needles C, the shaft P has been rotating and through the eccentric O, rod $o$, bell-crank N, pawl $n^2$, and the gear wheels $n$ and $k$ the cylinder K has been rotated in a manner to bring the master "face" card into operative alignment with the needles C. The pawl 177 has caused a rotation of the ratchet wheel 175 a distance equal to one tooth of the said wheel. The pawls 171 and 173 have also moved to a position to engage the next successive tooth in each of the respective ratchet wheels 170, 172.

The direction of movement of the oscillating arm L is then automatically reversed, which moves the needle operating carriage 10 and the recording device 20 away from the needles C, and causes the frame J and the card cylinder K to approach and finally engage the ends of the previously projected units of needles C which lie adjacent the said card cylinder K.

As above noted the master face card for the brown warp thread is in position on the card cylinder K, and as the said card cylinder continues to move toward the needles C the unpunched spots of the said master face card return all the corresponding needles of the previously projected units of needles to their normal positions, leaving in the projected position only those needles corresponding to the brown warp threads of each unit which had previously been selected. This is due to the fact that the brown spot on the master card had been punched and the end of the corresponding needle had entered the hole in the card and the aligned aperture in the cylinder K. Leaving these needles in their projected positions causes the corresponding punch locking rods D to remain over the upper ends of the corresponding punches F.

The punch plate or die G is then raised carrying the overlying loom "face" card upward into contact with the lower ends of the punches F. Those of the punches from over which the punch locking rods D had been removed are moved upwardly by the said loom "face" card, and those over which the locking rods D still remain are forced through the said card. The head I then recedes, the ineffective punches following the card downward. The card is simultaneously stripped from the effective punches by the stripper plate H.

As soon as the loom "face" card has been stripped from the punches F, the rocker arm T and pawls 171 and 173 move in such a direction as to cause the said cylinder R to be turned a distance of ninety degrees, bringing the loom "back" card into position under the punches F.

The direction of movement of the oscillating arm L is again reversed to move the said cylinder K away from the needles C and simultaneously with this second movement of the said cylinder K away from the needles C, the said card cylinder is turned to bring the master "back" card into operative position. The pawl 177 during this movement of the card cylinder K has again turned the ratchet wheel 175 the distance of one tooth thereof.

The needle operating carriage 10 at the same time is moving for a second time toward the needles C, and makes a second impression, the same as the first, on the series of needles C.

The direction of movement of the oscillating arm L is again reversed, and moves the carriage 10 away from one end of the needles C and the card cylinder K toward the opposite end of the said needles C. The master "back" card then causes all the needles which were projected by the second impression of the selection recorded by the plates 30—37 to be returned to their normal positions excepting those which enter the previously punched holes in the said master "back" card. These needles which remain in their projected position cause the corresponding punch locking rods D to remain over their corresponding punches F. The loom "back" card is then raised by the die plate G, the effective punches penetrating the card and the ineffective punches riding vertically on the card.

The oscillating arm L then reverses its direction of movement and the card cylinder K moves away from the needles C, incidently being turned to bring the third card of the master card string into alignment with the needles. This third card as above noted is a blank card. During this movement of the arm L, the pawl 177 moves the ratchet wheel 175 the space of another tooth of the said wheel.

The rocker arm T and pawls 171 and 173 then effects a one tooth movement of the ratchet wheels 170, 172 and a corresponding 90° movement of the card cylinder K, which brings the third card of the string of loom cards X under the punches F.

The movement of the ratchet wheel 175 on the last mentioned rearward movement of the card cylinder K has brought one of the lobes 179ᵇ of the cam 179 which is rotated by the ratchet wheel 175 under the lug 180 of the lever 181 causing the lever to be rocked on its pivot and the opposite end thereof to engage the collar 183 on the kick-off rod 184 moving this rod, and the attached controlling lever V of the machine, downward, thereby stopping the machine.

The punching of the first color on the loom cards corresponding to the lowermost transversely extending line of blocks on the plotted design is now complete and the operator then proceeds to clear the selection recording device 20 of the recorded selections of this line of the design. This is accomplished by depressing all the upper rods 64 of the individual locking plates 49 of the entire number of recording sections of the selection recording device 20.

For the purpose of convenience, I have applied a means for accomplishing this in one operation, rather than pressing the rods 64, 64 individually. This means comprises a bar 200 which extends transversely of the machine, above the pads 65, 65 of the rods 64, 64. The depressing bar 200 is pivotally attached at one of its ends to a lever 201, pivoted at 202 to one of the end standards 60 of the selection recording device 20, and at its opposite end to one arm 203 of a bell-crank lever which is pivoted at 204 to the standard at the opposite side of the device 20. The second arm 205 of this bell-crank lever lies in the path of the selector carriage 70, and is adapted to be engaged thereby.

When the operator moves the selector carriage 70 to the right on the needle operating carriage 10, he moves the said carriage 70 to a point beyond the point of registry with the first section of the selection recording device, and into contact with the arm 205 of the bell-crank lever 203, 205, causing it to be turned around its pivot 204, which causes the depressing bar to be moved downward into depressing engagement with the pads 65 of the release rods 64 thereby causing all the locking plates 49, 49 to be depressed to a position wherein the lugs 48 on the recording plungers 40—47 may move, under the influence of their springs 54, 54, through the apertures 55 in the said locking plates 49, 49. The recording unit plates 30—37 are thereby withdrawn to their inoperative positions, as shown in Fig. 12.

The operator then moves the selector carriage into registry with the first recording section of the selection recording device 20, which releases the bell-crank lever 203—205 and permits the depressing rod 200 to be raised to its inoperative position by a spring 206, which has one end attached to the lever 201, and its opposite end secured to a pin 207 extending upwardly from the securing bar 59 of the recording device 20.

If desired, the depressing bar 200ᵃ (see Fig. 39) may be longitudinally slotted at 210 and the depressing rods 64 may be provided with extensions 64ᵃ which pass through the slot 210, being provided with pads 65ᵃ on their upper ends. By this means any one of the locking plates 49 can be depressed individually, in case of error in making a selection.

After the operator has cleared the selection recording device 20, he then proceeds to make his selections of the second transversely extending row of blocks in the design, following the same operations as above noted with respect to the first row. After the second row selection has been made and recorded the operating rod 188 is again moved to start the machine.

The blank master card on the cylinder K, above noted as being in alignment with the needles C, first moves into engagement with the said needles to return them all to their inoperative positions, and the rocker arm T moves the pawls 171, 173 over the faces of the ratchet wheels 170, 172 to bring the said pawls behind the next successive tooth of each wheel. On the previous movement of the rocker arm T, the pawls 171, 173 and the ratchet wheels 170, 172, the ratchet wheel 172 had been moved to a position wherein one of the lugs 174 therein lies in such a position that when the rocker arm T moves the pawls 171, 173 over the faces of their respective ratchet wheels 170, 172 to engage the next successive tooth in each wheel the pawl 171 will ride up on the lug 174 and prevent the pawl 171 from engaging the tooth of the ratchet wheel 170, thereby preventing the card cylinder R from being moved, and maintaining the third card of the string of loom cards from being moved from under the punches F. The pawl 173, however, does engage the tooth of the ratchet wheel 172 and when the rocker arm T is again rocked in the direction to advance the ratchet wheel 172, the lug 174 therein will move from under the pawl 171 and on the following oscillation of the arm T both pawls 171 and 173 will operate their respective ratchet wheels 170, 172, and the ratchet wheel 172 will effect a 90° rotation of the card cylinder R.

The tie-up of the warp threads as set forth above is given merely for the purpose of describing the operation of my attachment as applied to a card repeating machine and as an illustration of a possible lay-out of a master back card. Obviously, the arrangement of the punched spots in the master back cards varies in accordance with the supervisor's instructions to the card puncher.

When the machine is to be employed as a repeater it is not necessary to remove my attachment and replace the needle evener cylinder thereon. Under these conditions the neutralizing plate illustrated in Figs. 40 and 41 and numbered 215 is placed on the selection recording device 20, and lies intermediate the selection recording unit plates 30—35 and the adjacent ends of the needle series C, as shown in Fig. 41. The neutralizing plate 215 is provided with a flange 216 which rests on the end brackets 60. The flange 216 is provided with apertures 217 through which screws 218 pass and are adapted to threaded openings 219 formed in the said brackets 60. The machine, when equipped with this neutralizing plate, can function as a repeating machine in the usual manner.

I claim:

1. In a card punching machine the combination of a series of punch controlling needles; means for selecting desired groups of the needles for operation; a device cooperatively associated with the said selecting means for recording the selections thereof, and adapted to effect movement of the selected groups of needles from their normal inoperative positions to their punch operating positions; and a master card for effecting the return of undesired needles of the selected groups to their normal inoperative positions.

2. In a card punching machine the combination of a series of punch controlling needles divided into a plurality of sections, each section being divided into a plurality of units comprising a definite number of the individual needles; means for selecting desired units of the sections of the needle series for operation; a selection recording device, divided into sections corresponding with the sections of the needle series and each recording section being divided into recording units corresponding to the units of needles, the units of said recording device being adapted to effect movement of the corresponding selected units of needles to punch operating positions; and a master card adapted to effect the return of the individual undesired needles of the selected units of needles to their normal inoperative positions.

3. In a card punching machine the combination of a series of punch controlling needles divided into a plurality of sections, and each section being divided into a plurality of units comprising a definite number of the individual needles; means for selecting desired units of the sections of the needle series for operation; a selection recording device divided into sections corresponding with the sections of the needle series and each recording section being divided into recording units corresponding to the units of needles, the units of said recording device being adapted to effect movement of the corresponding selected units of needles to punch operating positions; means for effecting a movement of said selecting means from one of said recording sections into registry with another of said recording sections of the selection recording device; and a master card adapted to effect the return of the individual undesired needles of the selected units of needles to their normal inoperative positions.

4. In a card punching machine the combination of a series of punch operating needles divided into a plurality of sections, each section being divided into a plurality of units comprising a definite number of individual needles; a card cylinder located at one end of said series of needles; a needle operating carriage adjacent the opposite end of said series of needles; a selector carriage on said needle operating carriage; a selection recording device on said needle operating carriage divided into sections corresponding with the sections of the series of needles in the machine, each recording section being divided into units corresponding to the said needle units; means on said selector carriage for selectively operating the separate recording units of any given section of the recording device; means for locking the recording units of each recording section in their recording positions; means for moving the selector carriage from one of the sections of the recording device to another thereof; a series of master cards on said card cylinder, some of which are provided with a plurality of holes arranged in predetermined orders and some of which are blanks; means for moving the needle operating carriage and consequently the locked units of the selection recording device into operative engagement with one end of the selected units of needles and the engaged units of needles into their punch operating positions; and means for subsequently moving the card cylinder and one of the said master cards into operative engagement with the opposite ends of the said selected units of needles, to return undesired individual needles of said selected units to their inoperative positions.

5. In a card punching machine the combination of a series of punch operating needles divided into a plurality of sections, each section being divided into a plurality of units comprising a definite number of individual needles; a card cylinder located at one end of said series of needles; a needle operating carriage adjacent the opposite end of said series of needles; a selector carriage on said needle operating carriage; a selection recording device on said needle operating carriage divided into sections corresponding with the sections of the series of needles in the machine, each recording section being divided into units corresponding to the said needle units; means on said selector carriage for selectively operating the separate recording units of any given section of the recording device; means for locking the recording units of each recording section in their recording positions; means for moving the selector carriage from one of the sections of the recording device to another thereof; a series of master cards on said card cylinder, some of which are provided with a plurality of holes arranged in predetermined orders and some of which are blanks; means for moving the needle operating carriage and consequently the locked units of the selection recording device into operative engagement with one end of the selected units of needles and the engaged units of needles into their punch operating positions; means for subsequently moving the card cylinder and one of the said master cards into operative engagement with the opposite end of the said selected units of needles, to return undesired individual needles of said selected units to their inoperative positions; and means for clearing the selection recording device of the recorded selections.

6. In a card punching machine the combination of a series of punch operating needles divided into a plurality of sections, each section being divided into a plurality of units comprising a definite number of individual needles; a card cylinder located at one end of said series of needles; a needle operating carriage adjacent the opposite end of said series of needles; a selector carriage on said needle operating carriage; a selection recording device on said needle operating carriage divided into sections corresponding with the sections of the series of needles in the machine, each recording section being divided into units corresponding to the said needle units; means on said selector carriage for selectively operating the separate recording units of any given section of the recording device; means for locking the recording units of each recording section in their recording positions; means for moving the selector carriage from one of the sections of the recording device to another thereof; a series of master cards on said card cylinder, some of which are provided with a plurality of holes arranged in predetermined orders and some of which are blanks; means for moving the needle operating carriage and consequently the locked units of the selection recording device into operative engagement with one end of the selected units of needles and the engaged units of needles into their punch operating positions; means for subsequently moving the card cylinder and one of the said master cards into operative engagement with the opposite end of the said selected units of needles, to return undesired individual needles of said selected units to their inoperative positions; means for rotating the card cylinder to bring said master cards successively into operative alignment with the series of needles, between successive operations of the needle operating carriage; and means for automatically stopping the machine when a predetermined number of complete cycles of operation thereof has been effected.

7. In a card punching machine the combination of a series of punch operating needles divided into a plurality of sections, each section being divided into a plurality of units comprising a definite number of individual needles; a punch controlled by each needle; means for moving a string of loom cards under said punches; a card cylinder located at one end of said series of needles; a needle operating carriage adjacent the opposite end of said series of needles; a selector carriage on said needle operating carriage; a selection recording device on said needle operating carriage, divided into sections corresponding with the sections of the series of needles in the machine, each recording section being divided into units corresponding to the said needle units; means on said selector carriage for selectively operating the separate recording units of any given section of the recording device; means for locking the recording units of each section of the recording device in their recording positions; means for moving the selector carriage from one of the sections of the recording device to another thereof; a series of master cards on said card cylinder, some of which are provided with a plurality of holes arranged in predetermined orders and some of which are blanks; means for moving the needle operating carriage and consequently the locked units of the selection recording device into operative engagement with the selected units of needles and the engaged units of needles into their punch operating positions; means for subsequently moving the card cylinder and one of the said master cards into operative engagement with the opposite end of the said selected units of needles, to return undesired individual needles of said selected units to their inoperative positions; means for rotating the card cylinder to bring said master cards successively into operative alignment with the series of needles, between successive operations of the needle operating carriage; means for periodically interrupting the action of the loom card feeding mechanism; and means for automatically stopping the machine when a predetermined number of complete cycles of operation thereof has been effected.

8. An attachment for use with a card punching machine having a plurality of punch recording needles comprising a selector carriage; a selection recording device consisting of a plurality of independent recording plates adapted to co-operate with said needles; selector keys on said selector carriage each key being adapted for operating a group of said recording plates; means for locking the recording plates in their recording positions; means for moving said selector carriage relative to said recording device; and means for registering the said selector carriage with different groups of said recording plates.

9. An attachment for use with a card punching machine having a plurality of punch recording needles comprising a needle operating carriage; a selector carriage on said needle operating carriage; a recording device on said needle operating carriage consisting of a plurality of independent recording plates adapted to co-operate with said needles; selector keys on said selector carriage for operating a group of said recording plates; means for locking the recording plates in their recording positions; means for moving said selector carriage in one direction relative to said recording device; an escapement device for effecting registration of said selector carriage successively with the groups of said recording plates; and a stepping key on said selector carriage for controlling said escapement device.

10. An attachment for use with a card punching machine having a plurality of punch recording needles comprising a needle operating carriage; a selector carriage on said needle operating carriage; a recording device on said needle operating carriage consisting of a plurality of independent recording plates adapted to co-operate with said needles; selector keys on said selector carriage for operating a group of said recording plates; means for moving said selector carriage in one direction relative to said recording device; means for locking the recording plates of the different groups thereof in their recording positions; a locking key on said selector carriage for operating said locking means; an escapement device for effecting registration of said selector carriage successively with the groups of said recording plates; and a stepping key on said selector carriage for controlling said escapement device.

11. An attachment for use with a card punching machine having a plurality of punch recording needles comprising a needle operating carriage; a selector carriage on said needle operating carriage; a recording device on said needle operating carriage consisting of a plurality of independent recording plates adapted to co-operate with said needles; selector keys on said selector carriage for operating a group of said recording plates; means for moving said selector carriage in one direction relative to said recording device; means for locking the recording plates of the different groups thereof in their recording positions; a locking key on said selector carriage for operating said locking means; an escapement device for effecting registration of said selector carriage successively with the groups of said recording plates; a stepping key on said selector carriage for controlling said escapement device; and means for manually moving said selector carriage in an opposite direction relative to said recording device.

12. An attachment for use with a card punching machine having a plurality of punch recording needles comprising a needle operating carriage; a selector carriage on said needle operating carriage; a recording device on said needle operating carriage consisting of a plurality of independent recording plates adapted to co-operate with said needles; selector keys on said selector carriage for operating a group of said recording plates; means for moving said selector carriage in one direction relative to said recording device; means for locking the recording plates of the different groups thereof in their recording positions; a locking key on said selector carriage for operating said locking means; an escapement device for effecting registration of said selector carriage successively with the groups of said recording plates; a stepping key on said selector carriage for controlling said escapement device; means for manually moving said selector carriage in an opposite direction relative to said recording device; and means for clearing the recording device of the recorded selections.

13. In an attachment for use with a card punching machine having a plurality of punch recording needles, a selection recording device comprising a plurality of selection recording plates arranged in groups adapted to co-operate with said needles, each group being operatively mounted in a separate frame removable from the said recording device, independent of the other groups of plates.

14. In an attachment for use with a card punching machine having a plurality of punch recording needles, a selection recording device comprising a plurality of independent sections, each of which consists of a frame; a plurality of recording plates slidably mounted in said frame and adapted to co-operate with said needles; a locking plunger for each plate; and locking means for each section adapted to engage the locking plungers of the section and thereby maintain the recording plates in their recording positions.

15. In an attachment for use with a card punching machine having a plurality of punch recording needles, a selection recording device comprising a plurality of sections; an independent frame for each section; a plurality of recording plates slidably mounted in each frame and adapted to co-operate with said needles; a locking plunger operatively connected to each recording plate and slidably mounted in the frame; a locking lug on each plunger; a locking plate slidably mounted in said frame perpendicular to said locking plungers and adapted to be moved into locking engagement with the lugs of the locking plungers.

16. In an attachment for use with a card punching machine having a plurality of punch recording needles, a selection recording device comprising a plurality of sections; an independent frame for each section; a plurality of recording plates slidably mounted in each frame and adapted to co-operate with said needles; a locking plunger operatively connected to each recording plate and slidably mounted in the frame; a locking lug on each plunger; a locking plate slidably mounted in said frame perpendicular to said locking plungers and adapted to be moved into locking engagement with the lugs of the locking plungers; a selector carriage adapted to be moved from one section to another of the recording device; a plurality of selector plungers slidably mounted in said carriage and adapted to register with the said locking plungers respectively; a plurality of selector keys on said selector carriage respectively and operatively connected to the said selector plungers; a key on said carriage for operating the said locking plate; and means connected to said locking plate and adapted to be engaged by the said locking key when the selector carriage is in registry with the particular section of the recording device for operating the locking plate of said section.

17. In an attachment for use with a card punching machine having a plurality of punch recording needles; a needle operating carriage; a selector carriage movably mounted on said needle operating carriage; a selection recording device rigidly secured to said needle operating carriage and comprising a plurality of independent sections; a plurality of recording plates in each section adapted to co-operate with said needles; an escapement device for effecting registry of the selector carriage with the different sections of the recording device successively and comprising a notched plate secured to said needle operating carriage; a lever pivoted to said selector operating carriage; a blade fixed to said lever and adapted to be moved into and out of the notches in said bar; a second blade on said lever adapted to enter and leave said notches in alternate succession with respect to the first blade and capable of lateral movement relative to said lever; a stepping key on said selector carriage for operating said lever; and means on said needle operating carriage for moving the selector carriage in one direction thereon when the stepping key is operated.

18. In an attachment for use with a card punching machine having a plurality of punch recording needles, a needle operating carriage, a selector carriage movably mounted on said needle operating carriage; a selection recording device rigidly secured to said needle operating carriage and comprising a plurality of independent sections; a plurality of recording plates in each section adapted to co-operate with said needles; an escapement device for effecting registry of the selector carriage with the different sections of the recording device successively and comprising a notched plate secured to said needle operating carriage; a lever pivoted to said selector operating carriage; a blade fixed to said lever and adapted to be moved into and out of the notches in said bar; a second blade on said lever adapted to enter and leave said notches in alternate succession with respect to the first blade and capable of lateral movement relative to said lever; a stepping key on said selector carriage for operating said lever; means on said needle operating carriage for moving the selector carriage in one direction thereon when the stepping key is operated; and means on said selector carriage for moving both of said blades clear of said notched bar for permitting the selector carriage to be selectively moved into registry with any desired one of said sections of the recording device.

GEORGE W. NEVILLE.